United States Patent
Klingbeil et al.

(10) Patent No.: US 11,598,276 B1
(45) Date of Patent: Mar. 7, 2023

(54) METHODS AND SYSTEMS FOR MULTI-FUEL ENGINE

(71) Applicant: Transportation IP Holdings, LLC, Norwalk, CT (US)

(72) Inventors: Adam Edgar Klingbeil, Ballston Lake, NY (US); Thomas Michael Lavertu, Ballston Lake, NY (US); Eric Dillen, Edinboro, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/643,304

(22) Filed: Dec. 8, 2021

(51) Int. Cl.
| | |
|---|---|
| *F02D 41/00* | (2006.01) |
| *F02D 41/14* | (2006.01) |
| *F02M 26/05* | (2016.01) |
| *F02M 26/45* | (2016.01) |
| *F02M 26/22* | (2016.01) |
| *F02D 41/40* | (2006.01) |
| *F02D 13/02* | (2006.01) |
| *F02P 5/15* | (2006.01) |
| *F02B 43/12* | (2006.01) |

(52) U.S. Cl.
CPC .......... *F02D 41/0047* (2013.01); *F02B 43/12* (2013.01); *F02D 13/0249* (2013.01); *F02D 41/005* (2013.01); *F02D 41/0025* (2013.01); *F02D 41/403* (2013.01); *F02M 26/05* (2016.02); *F02M 26/22* (2016.02); *F02M 26/45* (2016.02); *F02P 5/1502* (2013.01); *F02D 2041/1472* (2013.01)

(58) Field of Classification Search
CPC ............. F02D 41/0025; F02D 41/0047; F02D 41/005; F02D 41/0055; F02D 41/0057; F02D 2041/1472; F02M 26/05; F02M 26/22; F02M 26/25
USPC ..................... 123/25 A, 25 E, 25 Q, 299, 525
See application file for complete search history.

(56) References Cited

U.S. PATENT DOCUMENTS

| | | | | |
|---|---|---|---|---|
| 7,302,918 B2 * | 12/2007 | Munshi | ................... | F02D 19/10 123/304 |
| 8,327,823 B2 * | 12/2012 | Courtoy | .............. | F02D 19/0647 123/25 C |
| 9,920,699 B1 * | 3/2018 | McQuillen | .......... | F02D 41/0025 |
| 2016/0131048 A1 * | 5/2016 | Surnilla | .............. | F02D 41/1456 701/104 |
| 2016/0252027 A1 * | 9/2016 | Jackson | .............. | F02D 19/0694 60/605.2 |
| 2017/0234245 A1 * | 8/2017 | Bruner | .................... | F02D 19/10 123/525 |
| 2017/0284315 A1 * | 10/2017 | Asai | ......................... | F02B 51/00 |
| 2019/0323458 A1 * | 10/2019 | Voice | ..................... | F02M 26/35 |
| 2020/0182165 A1 * | 6/2020 | Kokjohn | ............. | F02D 19/0644 |
| 2022/0163005 A1 * | 5/2022 | Pedder | .................. | F02D 35/027 |
| 2022/0213849 A1 * | 7/2022 | Wickman | ........... | F02M 21/0206 |

* cited by examiner

*Primary Examiner* — Erick R Solis
(74) *Attorney, Agent, or Firm* — McCoy Russell LLP

(57) ABSTRACT

Methods and systems are provided for adjusting a substitution ratio based on water in a combustion mixture of a multi-fuel engine. In one example, a method includes adjusting a substitution ratio in response to an amount of water provided to a multi-fuel engine configured to combust a first fuel and a second fuel, the second fuel different than the first fuel.

12 Claims, 8 Drawing Sheets

|  | Cylinder 1 | Cylinder 2 |
| --- | --- | --- |
| Water amount | Higher | Lower |
| Substitution Rate | Higher | Lower |
| Primary Fuel Injection | Earlier | Later |

FIG. 8

METHODS AND SYSTEMS FOR MULTI-FUEL ENGINE

BACKGROUND

Technical Field

Embodiments of the subject matter disclosed herein relate to a multi-fuel engine, and more specifically, to adjusting operating conditions to enhance combustion of certain fuel types by adjusting fuel ratios and timings.

Discussion of Art

Internal combustion engines may include compression-ignition and/or spark-ignition engines. The engine may combust multiple types of fuel. The engine may include multiple injectors positioned to inject directly into a combustion chamber and into an intake port of the engine. A substitution ratio of the engine fuels may be adjusted to adjust engine power output, emissions, engine temperature, and so forth. Some fuels, while energy dense, may be prone to generating poor combustion conditions due to a high heat of vaporization, poor mixing, and/or low flame speed. It may therefore be desirable to have methods and systems for fuel combustion which differ from those that are currently available.

BRIEF DESCRIPTION

In one embodiment, a method may include adjusting a substitution ratio in response to an amount of water provided to a multi-fuel engine configured to combust a first fuel and a second fuel, the second fuel different than the first fuel. The substitution ratio may be defined as a percentage of total fuel energy provided by the second fuel. The first fuel may include a carbon-containing fuel and the second fuel may include a carbon-free fuel. The carbon-free fuel may include one or more of ammonia and hydrogen. The carbon-containing fuel may include one or more of diesel, hydrogenation-derived renewable diesel (HDRD), biodiesel, syn-gas, alcohol, gasoline, kerosene, ether, and natural gas. The adjusting may further include adjusting injection timings, exhaust gas recirculation, and carbon-free fuel amounts relative to one another based on engine conditions, such as load. By doing this, consumption of carbon-containing fuels may be reduced across a greater range of engine operating conditions.

BRIEF DESCRIPTION OF THE DRAWINGS

FIG. 8 shows a table illustrating cylinder conditions in response to an amount of water provided thereto.

DETAILED DESCRIPTION

Figure 1:
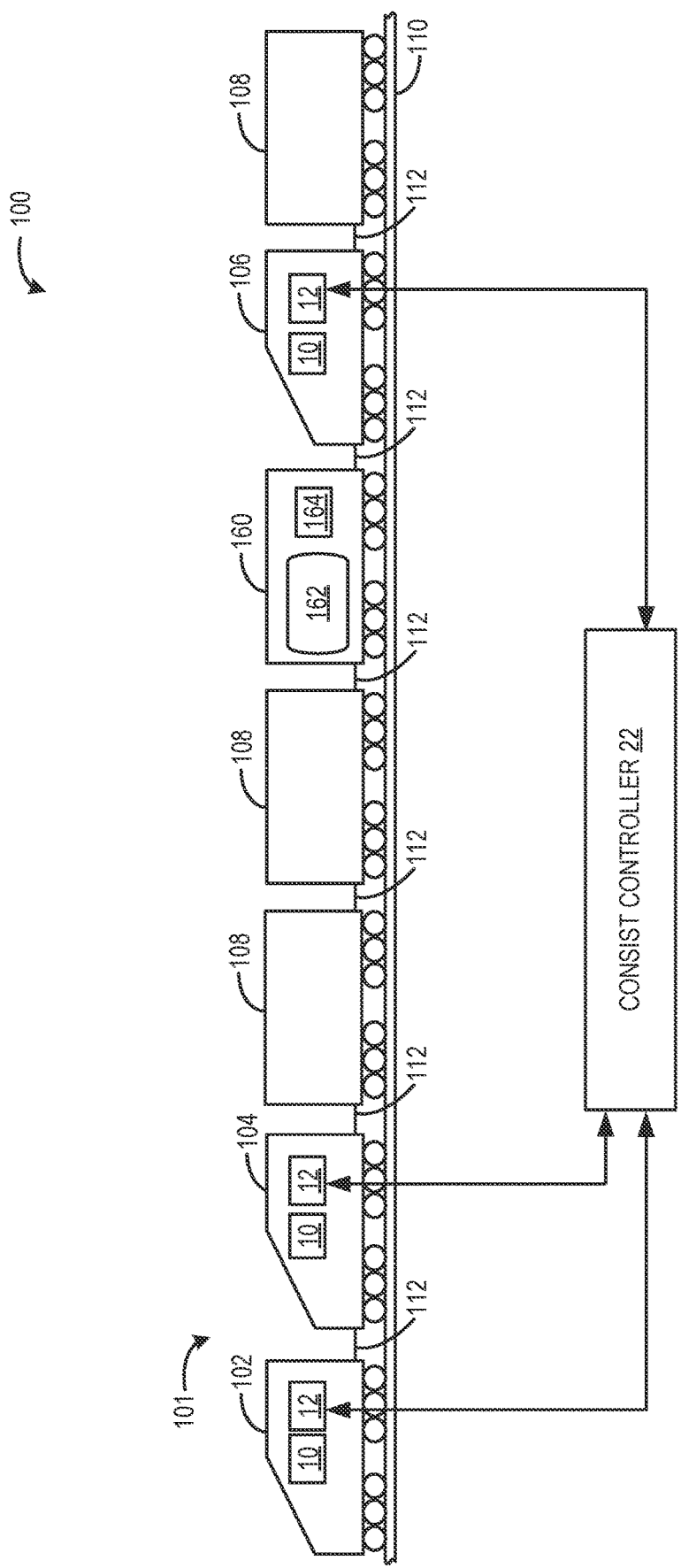
FIG. 1 shows an example embodiment of a train including a locomotive consist.

Embodiments of the invention are disclosed in the following description, and may relate to methods and systems for increasing performance of an internal combustion engine (ICE). The ICE may operate via a combination of different fuels. These fuels may have relatively different amounts of carbon. In one example, the ICE may be a multi-fuel engine configured to combust a plurality of fuels. The ICE may combust one or more of gasoline, diesel, hydrogenation-derived renewable diesel (HDRD), alcohol(s), ethers, ammonia, biodiesels, hydrogen, natural gas, kerosene, syn-gas, and the like. The plurality of fuels may include gaseous fuels and liquid fuels, alone or in combination. A substitution ratio of a primary fuel of the ICE with a secondary fuel may be determined based on a current engine load. The substitution ratio may be defined as a percentage of total fuel energy provided by the second fuel. In one embodiment, the substitution ratio may correspond to an injection amount of a fuel with a relatively lower carbon content or zero carbon content (e.g., hydrogen gas or ammonia). As the substitution ratio increases, the relative proportion of fuel with the lower or zero carbon content increases and the overall amount of carbon content in the combined fuel lowers.

In one example, the ICE may combust fuels that include both diesel and hydrogen. During some operating modes, the ICE may combust only diesel, only hydrogen, or a combination thereof (e.g., during first, second, and third conditions, respectively). When hydrogen is provided, operating conditions may be adjusted to promote enhanced combustion of the hydrogen.

The engine system may be further configured to combust a mixture of three or more fuels including diesel, hydrogen, and ammonia. Additionally or alternatively, ethanol may be included in the combustion mixture. An engine configuration of the ICE may be adjusted to advantageously arrange one or more ammonia injectors in various locations where ammonia may premix with hot exhaust gases. By doing this, the ignitibility of ammonia may be increased without increasing engine or intake manifold temperatures to vaporize the ammonia. For example, an injector may be positioned in an exhaust port and may inject ammonia toward an exhaust valve of a combustion chamber. In some examples, the exhaust valve opening and closing may be delayed to increase exhaust gas re-ingestion when the ammonia is injected to the exhaust port. Exhaust gas re-ingestion may include where exhaust gases expelled from the combustion chamber are sucked back into the combustion chamber by maintaining the exhaust valve open during the intake stroke. Exhaust gas retention may include where the exhaust valve timing is adjusted to decrease an amount of exhaust gas expelled from the cylinder by closing the exhaust valve before a completion of an exhaust stroke. Both exhaust gas re-ingestion and exhaust gas retention may affect an exhaust gas recirculation (EGR) flow rate. The exhaust gas used in the exhaust gas re-ingestion and the exhaust gas retention may have a higher temperature relative to EGR from an EGR passage as less heat is lost to various engine materials, an EGR cooler, and an ambient atmosphere. The highest exhaust gas temperatures may vaporize the ammonia, which may enhance an ignitibility thereof. Other operating adjustments may include activating a donor cylinder, premixing diesel with ammonia via an advanced diesel injection timing, and/or injecting ammonia directly into an EGR stream.

The donor cylinder may be configured to flow all or a portion of exhaust gas therefrom to another cylinder. By doing this, EGR may be delivered along a route different than an EGR passage through which the EGR stream flows. Various examples and routines for promoting ammonia combustion are described herein.

In one example, systems and methods for the multi-fuel engine may include combusting a primary fuel in combination with one or more secondary fuels. The multi-fuel engine may be configured to combust the primary fuel alone. During some conditions, the multi-fuel engine may be configured to decrease an amount of primary fuel used via substituting one or more secondary fuels into a combustion mixture. The secondary fuels may include a reduced carbon-content relative to the primary fuel. Additionally or alternatively, the secondary fuels may be less expensive, more available, and/or more efficient. The secondary fuels may vary in ignitibility and burn characteristics. An ignition timing of the multi-fuel engine may be adjusted in response to the combustion mixture to account for inclusion of the secondary fuels. For example, the ignition timing may be retarded as an amount of hydrogen is increased. As another example, the ignition timing may be advanced as an amount of ammonia is increased. The ignition timing may be further adjusted in this way in response to addition and subtraction of the primary and one or more secondary fuels to the combustion mixture. By doing this, knock, misfire, and pre-combustion may be mitigated. In one example, timing is retarded to mitigate knock and pre-combustion. As another example, timing is advanced to improve combustion efficiency or mitigate misfire.

Embodiments of the system described herein may include a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles (e.g., automobiles), mining equipment, marine vessels, aircrafts, rail vehicles, and other off-highway vehicles (OHVs). For clarity of illustration, a rail vehicle such as a locomotive may be provided as an example of a mobile platform. In one example, a vehicle system may include an engine, a turbocharger, an aftertreatment system, a fuel system, and a control system.

Before further discussion of the methods for increasing engine startup efficiency, an example platform in which the methods may be implemented is shown. FIG. 1 depicts an example train 100, including a plurality of rail vehicles, a fuel tender 160, and cars 108, configured to run on track 110. The plurality of rail vehicles, the fuel tender, and the cars are coupled to each other through couplers 112. In one example, the plurality of rail vehicles may be locomotives, including a lead locomotive 102 and one or more remote locomotives 104, 106. While the depicted example shows three locomotives, one fuel tender, and four cars, any appropriate number of locomotives, fuel tenders, and cars may be included in the train. Further, the locomotives in the train may form a consist. For example, in the embodiment depicted, the locomotives may form consist 101. As illustrated, the train includes one consist. However, any appropriate number and arrangement of consists is within the scope of this disclosure. Furthermore, the consist, while depicted with three locomotives in FIG. 1, may include more or less than three locomotives in other examples.

In some examples, the consist may include successive locomotives, e.g., where the locomotives are arranged sequentially without cars positioned in between. In other examples, as illustrated in FIG. 1, the locomotives may be separated by one or more cars in a configuration enabling distributed power operation. In this configuration, throttle and braking commands may be relayed from the lead locomotive to the remote locomotives by a radio link or physical cable, for example.

The locomotives may be powered by engine 10, while the cars may be non-powered. In one example, the engine may be a multi-fuel engine. For example, the engine may be configured to combust gaseous and/or liquid fuels with different amounts of carbon, in varying ratios. Further details of the engine are provided further below, with reference to FIG. 2.

The train may further include a control system including at least one engine controller 12 and at least one consist controller 22. As depicted in FIG. 1, each locomotive includes one engine controller, all of which are in communication with the consist controller. The consist controller may be located on one vehicle of the train, such as the lead locomotive, or may be remotely located, for example, at a dispatch center. The consist controller is configured to receive information from, and transmit signals to, each of the locomotives of the consist. For example, the consist controller may receive signals from a variety of sensors on the train and adjust train operations accordingly. The consist controller is also coupled to each engine controller for adjusting engine operations of each locomotive. As elaborated with reference to FIGS. 3-7, each engine controller may determine a current engine condition and adjust a substitution ratio thereof. An ignition timing may be adjusted based on the substitution ratio. As described above, the substitution ratio corresponds to a substitution of a primary fuel with one or more alternative fuels. The engine may be configured to combust with the primary fuel alone. However, during some conditions of the engine, it may be desired to perform multi-fuel combustion to decrease one or more emission types, decrease combustion costs, increase engine efficiency, and accommodate a low availability of one or more fuels. The primary fuel and the alternative fuels may include one or more of gasoline, diesel, hydrogenation-derived renewable diesel (HDRD), alcohol(s), ethers, ammonia, biodiesels, hydrogen, natural gas, kerosene, syngas, and the like. Additionally or alternatively, electrical energy may be used to propel the train.

The train may include at least one fuel tender, which may be configured to carry one or more fuel storage tanks 162 and includes a controller 164. While the fuel tender is positioned in front of the remote locomotive 106, other examples may include alternate locations of the fuel tender along the train. For example, the fuel tender may be instead positioned behind the remote locomotive or between the lead locomotive and the remote locomotive.

Figure 2:
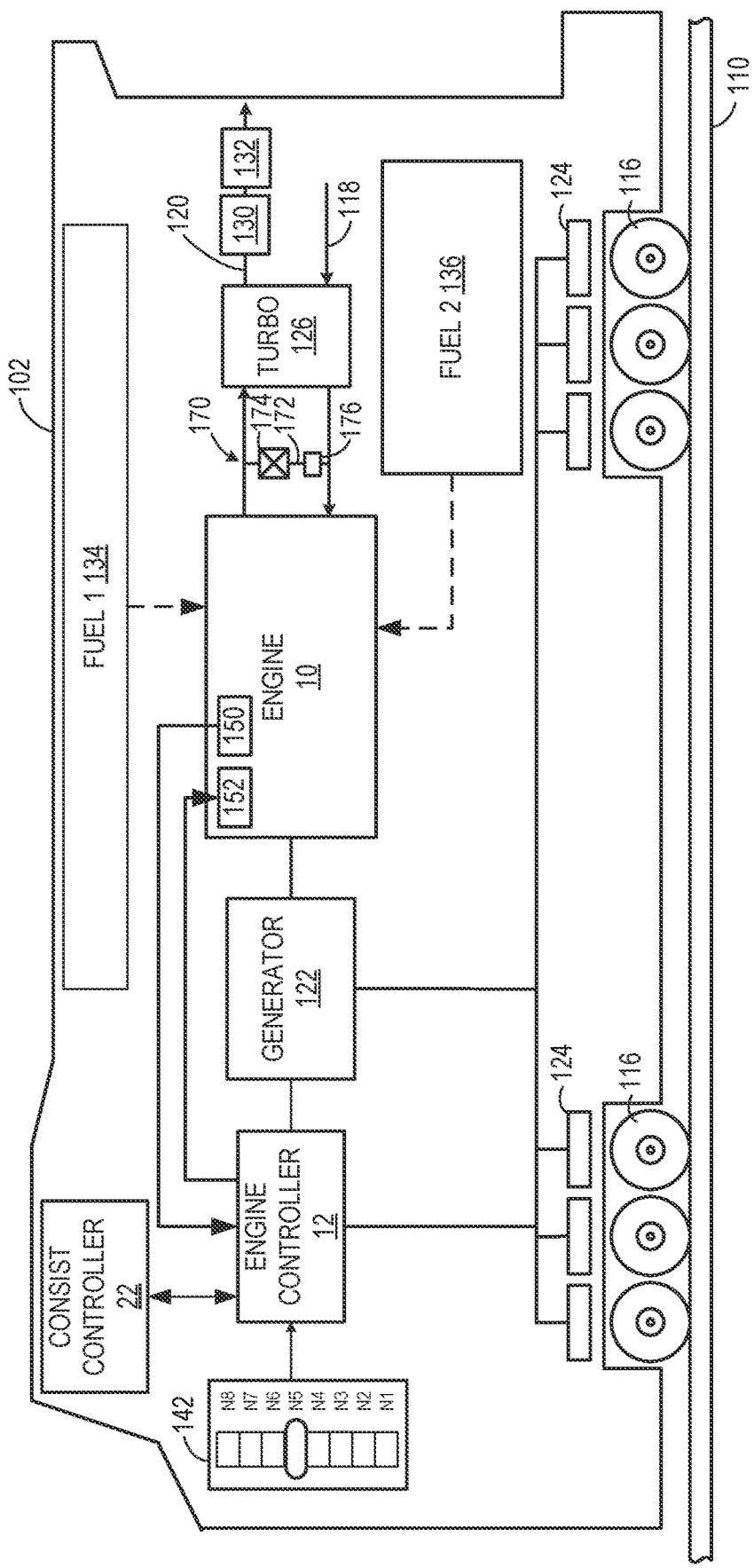
FIG. 2. shows a schematic diagram of an example embodiment of a locomotive from FIG. 1 with a multi-fuel engine.
Figure 3:
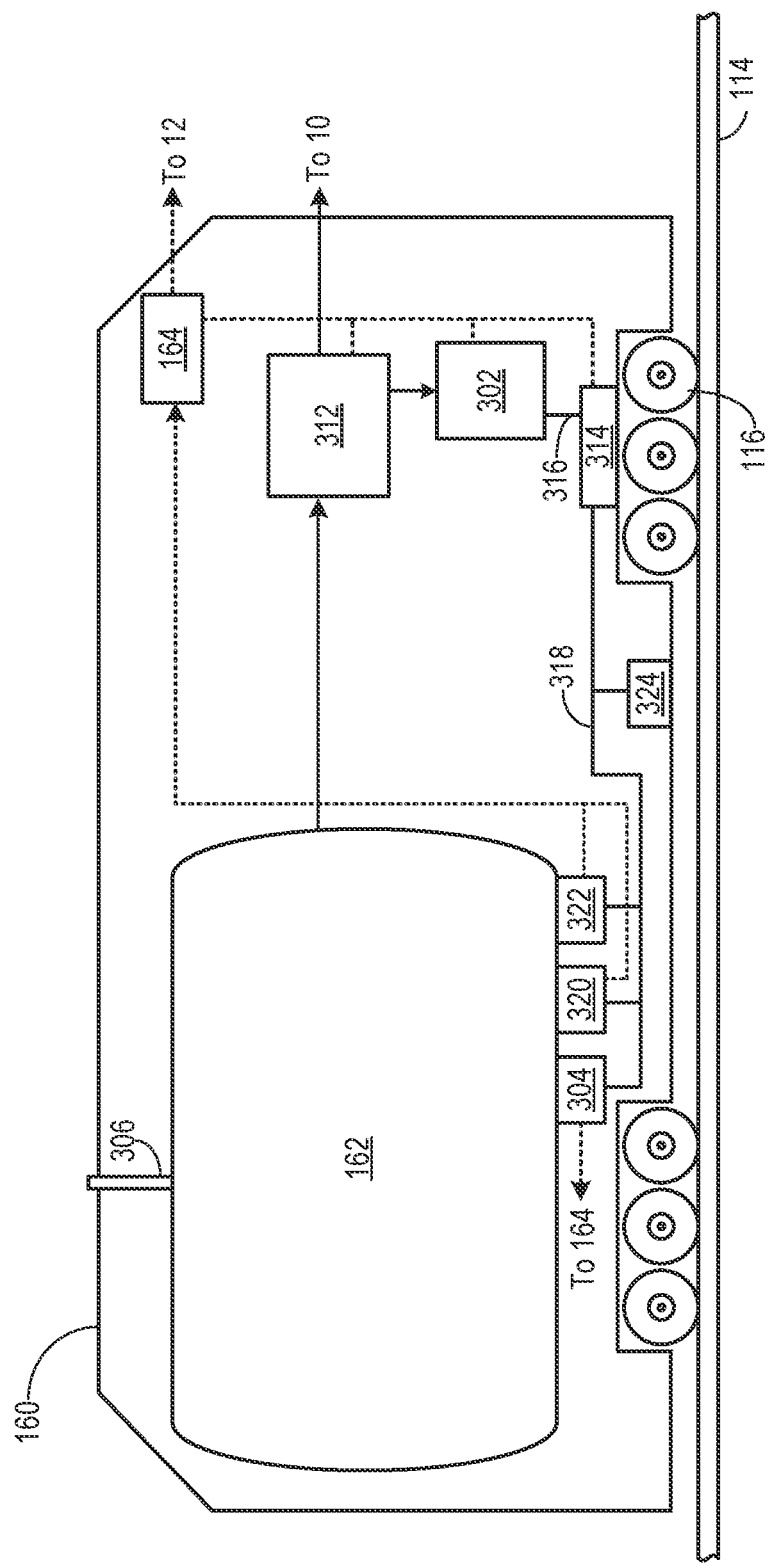
FIG. 3 shows an example embodiment of a fuel tender which may be included in the train of FIG. 1.

In one example, the fuel tender may be non-powered for propulsion, e.g., without an engine or electric traction motors (e.g., electric traction motors 124 shown in FIG. 2). However, in other examples, the fuel tender may be powered for propulsion. For example, as shown in FIG. 3, the fuel tender may include an engine (e.g., engine 302), which may be similarly configured to the engines of the locomotives, or may have a different configuration. The engine of the fuel tender may combust the fuel stored in the fuel storage tank and/or fuel stored at another vehicle of the train.

The one or more fuel storage tanks of the fuel tender may have a suitable structure for storing a specific type of fuel.

In one example, the fuel storage tank may be adapted for cryogenic storage of liquefied natural gas (LNG). As another example, the fuel storage tank may store a fuel in a liquid state at ambient temperature and pressure, such as diesel or ammonia. In yet another example, the fuel storage tank may be configured to store a fuel as a compressed gas, such as hydrogen. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, however, fuel may be stored both at the fuel tender and at one or more of the locomotives, e.g., as shown in FIG. 2. In addition, in some instances the fuel tender may also be configured to store a fuel cell system, including a fuel cell and one or more tanks of compressed hydrogen gas. Alternatively, the fuel cell system may be stored at one or more of the locomotives.

FIG. 2 depicts an example embodiment of a rail vehicle of the train from FIG. 1, herein depicted as the locomotive 102, configured to run on the track via a plurality of wheels 116. Power for propulsion of the locomotive may be supplied at least in part by the engine. The engine receives intake air for combustion from an intake passage 118. The intake passage receives filtered ambient air from an air filter (not shown). Exhaust gas resulting from combustion in the engine is supplied to an exhaust passage 120. Exhaust gas flows through the exhaust passage, and out of an exhaust stack (not shown) of the locomotive.

In one embodiment, the engine operates as a compression ignition engine configured to combust at least one type of fuel. In another embodiment, the engine operates as a spark ignition engine similarly configured to combust at least one type of fuel. For example, the engine may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual fuel engine, as depicted in FIG. 2, the dual fuel engine configured to receive a first fuel from a first fuel reservoir 134 and a second fuel from a second fuel reservoir 136.

While the locomotive is equipped with two fuel reservoirs in FIG. 2, in other examples, the locomotive may include only one fuel reservoir or no fuel reservoir. For example, at least one of the fuel reservoirs may be stored at the fuel tender, e.g., the fuel tender of FIG. 1. Alternatively, a third fuel may be stored at the fuel tender in addition to the first fuel at the first fuel reservoir and the second fuel at the second fuel reservoir of the locomotive. In one example, fuels which may be stored at ambient pressure and temperature without any additional equipment or specialized storage tank configurations, such as diesel, may be stored at the locomotive. Fuels demanding specialized equipment, such as for cryogenic or high pressure storage, may be stored on-board the fuel tender. In other examples, however, the locomotive and the fuel tender may each store fuels that do not demand specialized equipment.

The first, second, and third fuels (e.g., any fuels stored on-board the train) may each be any of a number of different fuel types. For example, the types of fuel may include carbon-based fuels, such as diesel, natural gas, methanol, ethanol, other alcohols, dimethyl ether (DME), other ethers, biodiesel, HDRD, syn-gas, etc. Alternatively, the fuels may be non-hydrocarbon-based fuels, such as hydrogen, ammonia, etc. The fuels listed above are non-limiting examples of fuels which may be combusted at the engine, and various other types of fuels are possible.

Additionally, each of the stored fuels may be a gaseous or a liquid phase fuel. Thus, when configured as a compression ignition engine combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when configured as a spark ignition engine combusting a single fuel type, the engine may also consume either a gaseous fuel or a liquid fuel. When configured as a multi-fuel spark ignition engine, the engine may combust only liquid fuels, only gaseous fuels, or a combination of liquid and gaseous fuels.

In either of the spark ignition or the compression ignition multi-fuel engine configurations, the engine may combust fuel combinations in different manners. For example, one fuel type may be a primary combustion fuel, and another fuel type may be a secondary, additive fuel used under certain conditions to adjust combustion characteristics. For example, during engine startup, a fuel combustion mixture may include a smaller proportion of diesel to seed ignition while hydrogen may form a larger proportion of the mixture. In other examples, one fuel may be used for pilot injection prior to injection of the primary combustion fuel. In some examples, the substitution ratio may be set based on one or more conditions to increase an amount of carbon-free fuel to decrease carbon emissions. A ratio of carbon-free fuels used may be adjusted based on a desired ignitability, wherein the desired ignitability is based on one or more of an engine load, an intake manifold temperature and pressure, and an ignitibility of the fuel mixture.

The engine, as the multi-fuel engine, may be configured to combust various combinations of the fuels, and the fuels may be premixed or not premixed prior to combustion. In one example, the first fuel may be diesel and the second fuel may be hydrogen. In another example, the first fuel may be diesel and the second fuel may be ammonia. In yet another example, ethanol may be included with the first and second fuels. Further combinations are possible with storage of the third fuel on the fuel tender. For example, LNG may be stored at the fuel tender and the engine may be configured to combust LNG and hydrogen, or LNG, diesel, and hydrogen, or LNG, ammonia, and hydrogen. As such, numerous combinations of fuel types are possible, where the combinations may be determined based on compatibility of the fuels. A method of delivery of the fuels to the engine for combustion may similarly depend on properties of the fuel type.

When engine conditions permit combustion of only a single fuel (either spark ignition or compression ignition), the engine may consume a single liquid phase fuel. For example, the engine may combust diesel, gasoline, ammonia, LNG, or another liquid phase fuel. Similarly, the engine may be configured to combust a single gaseous fuel, such as hydrogen, or another gaseous fuel.

Furthermore, a fuel that is stored on-board in one physical state, e.g., gas or liquid, may be delivered to the engine in the same state or a different state. For example, LNG may be stored cryogenically in the liquid phase but may undergo a transition to the gas phase, e.g., at a regasification unit in the fuel tender, prior to injection at the engine. Other fuels, however, may be stored as a liquid and injected as a liquid or stored as a gas and injected as a gas.

Fuels may be injected at the engine according to more than one injection technique, for example. In one example, one or more of the fuels may be delivered to the engine cylinders via an indirect injection method, such as intake-port injection and/or exhaust-port injection. In another example, at least one of the fuels may be introduced to the engine cylinders via direct injection. In yet another example, at least one of the fuels may be injected by central manifold injection. The engine may be configured to receive the fuels exclusively by indirect injection, exclusively by direct injection, or by a combination of indirect and direct injection. In particular, when one of the fuels is a gaseous fuel, premixing the gaseous fuel, with air and/or EGR, may be desirable via port injection. The fuels may also be premixed when introduced by central manifold injection. Premixing by direct injection is also possible, such as by injection of the gaseous fuel during an intake stroke of the engine cylinders. Additionally or alternatively, a location of injection of one or more fuels may be based on an ignitibility of a fuel. For example, ammonia may be injected indirectly and premixed with boost air and/or EGR to enhance an ignitibility and a vaporization thereof.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be injected by port injection or direct injection. Similarly, fuels such as methanol and ethanol may also be either port injected or direct injected. In some instances, the engine may be configured with fuel injectors capable of switching between injection of gaseous fuels and of liquid fuels.

The fuels combusted by the multi-fuel engine, whether in the gas phase or liquid phase, may or may not be premixed prior to combustion according to the type of fuel. For example, depending on operating conditions, premixing of hydrogen, natural gas, ammonia, methanol, ethanol, and DME may be desirable. During other operating conditions, fuels such as diesel, hydrogen, natural gas, methanol, and ethanol may not be premixed. For example, a greater magnitude of premixing hydrogen may be desired at higher loads and a lower magnitude of premixing hydrogen may be desired at lower loads. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other examples, the fuel(s) may be injected into a pre-combustion chamber fluidly coupled to a cylinder head where the fuel(s) may mix with air in the pre-combustion chamber before flowing to the cylinder head. Increasing the premixing may involve, for example, injecting more fuel during the intake stroke or early in the intake stroke. Decreasing premixing may include injecting more fuel late in the intake stroke or direct-injecting fuel during the early or middle part of the compression stroke.

Alternatively, as described above, the fuels may be delivered to the engine cylinders by directly injecting one or more fuels into the engine cylinders when the cylinders are filled with at least the compressed air and, in some instances, the gas phase fuel. Direct injection may include high pressure direct injection (HPDI) and low pressure direct injection (LPDI). When direct injected, the fuels may not be premixed, in one example. However, in another example, premixing may be enabled by direct injection of one or more of the fuels prior to a compression stroke of the engine cylinders, as described above.

For embodiments of the engine where the first fuel is diesel and the second fuel is hydrogen, premixing of the hydrogen with air through port-injection may provide more stable air/fuel mixtures at low engine speeds and smoother engine startups. However, at higher engine speeds, port injection of the hydrogen may increase a likelihood of engine knock. Direct injection of the hydrogen may mitigate knock. Thus, in some examples, combined application of port injection of hydrogen at low engine speeds and direct injection of hydrogen at high engine speeds to mitigate knock may be desirable. Additionally or alternatively, a fuel with a lower ignitibility, such as ammonia, may be premixed with hydrogen to mitigate knock.

Furthermore, a type of gaseous fuel used may determine whether direct injection of the fuel may include HPDI or LPDI, or both HPDI and LPDI. For example, hydrogen, when stored as a compressed gas, may be injected by HPDI or by LPDI, depending on engine load and available delivery pressure. In particular, HPDI of hydrogen may alleviate knock due to continuous burning of the hydrogen as the hydrogen mixes in the engine cylinders. Furthermore, HPDI may enable greater substitution ratios of hydrogen, e.g., substituting for diesel, for example, thereby decreasing hydrocarbon, $NO_x$, and particulate matter emissions during engine operation.

As shown in FIG. 2, the engine is coupled to an electric power generation system, which includes an alternator/generator 122 and the electric traction motors. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to the electric traction motors and the alternator/generator may provide electrical power to the electric traction motors. As depicted, the electric traction motors are each connected to one of a plurality of wheels to provide tractive power to propel the locomotive. One example locomotive configuration includes one traction motor per wheel. As depicted herein, six pairs of traction motors correspond to each of six pairs of wheels of the locomotive.

The locomotive may further include a turbocharger 126 arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine, may be regulated.

The locomotive further may include an exhaust gas recirculation (EGR) system 170, which routes exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., $NO_x$). The EGR valve may be an on/off valve controlled by the locomotive controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger relative to a direction of exhaust gas flow. Additionally, the EGR system may be a donor cylinder EGR system, where one or more cylinders provide exhaust gas only to the EGR passage, and then to the intake. Additionally or alternatively, the donor cylinder EGR system may include routing exhaust gases directly to one or more adjacent cylinders.

The locomotive includes an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF is configured to trap particulates, also known as particulate matter (an example of which is soot), produced during combustion. The DPF may be comprised of ceramic, silicon carbide, or any suitable material. In other embodiments, the exhaust gas treatment system may additionally include a selective catalytic reduction (SCR) catalyst, three-way catalyst, NO trap, or various other emission control devices or combinations thereof. In some embodiments, the exhaust gas treatment system may be positioned upstream of the turbocharger, while in other embodiments, the exhaust gas treatment system may be positioned downstream of the turbocharger.

The locomotive may further include a throttle 142 coupled to the engine to indicate power levels. In this embodiment, the throttle is depicted as a notch throttle. However, any suitable throttle is within the scope of this disclosure. Each notch of the notch throttle may correspond to a discrete power level. The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and dynamic brake modes. In some embodiments, the notch setting may be selected by a human operator of the locomotive. In one example, a value of the notch setting corresponds to an engine load, wherein a higher value is equal to a higher engine load. In other embodiments, the consist controller may determine a trip plan (e.g., a trip plan may be generated using trip optimization software, such as Trip Optimizer system available from Wabtec Corporation, and/or a load distribution plan may be generated using consist optimization software such as Consist Manager available from Wabtec Corporation), including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller and consist controller may additionally or alternatively include a memory holding non-transitory computer readable storage media (not shown), including code for enabling on-board monitoring and control of locomotive operation. The engine controller may be coupled to the consist controller, for example, via a digital communication channel or data bus.

Both the engine controller and the consist controller may receive information from a plurality of sensors, and may send control signals to a plurality of actuators. The engine controller, while overseeing control and management of the locomotive, may be configured to receive signals from a variety of engine sensors 150, as further elaborated herein, in order to determine operating parameters and operating conditions, and correspondingly adjust various engine actuators 152 to control operation of the locomotive. For example, the engine controller may receive signals from various engine sensors including, but not limited to, engine speed, engine load, intake manifold air pressure, boost pressure, exhaust pressure, ambient pressure, ambient temperature, exhaust temperature, engine temperature, exhaust oxygen levels, etc. Correspondingly, the engine controller may control the locomotive by sending commands to various components such as the electric traction motors, the alternator/generator, cylinder valves, fuel injectors, the notch throttle, etc. Other actuators may be coupled to various locations in the locomotive.

The consist controller may include a communication portion operably coupled to a control signal portion. The communication portion may be configured to receive signals from locomotive sensors, including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. The control signal portion may generate control signals to trigger various locomotive actuators. Example locomotive actuators may include air brakes, brake air compressor, traction motors, etc. Other actuators may be coupled to various locations in the locomotive. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, etc. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may be configured to push propulsion of the train and the locomotive at the front of the train may be configured to pull the train, particularly during uphill navigation. As such, a greater load may be placed on the pushing locomotive at the end of the train.

Turning now to FIG. 3, an embodiment of the fuel tender of FIG. 1 is shown. As described above, the fuel tender includes the fuel storage tank, the controller, and the engine. The fuel tender may further include a first unit 304, which may be a device for controlling a temperature and pressure within the fuel storage tank. For example, when LNG is stored in the fuel storage tank, the first unit may be a cryogenic unit. The fuel storage tank may have various sizes and configurations, may be removable from the fuel tender, and may be configured to receive fuel from an external refueling station via port 306.

The fuel storage tank may supply fuel to a fuel modification unit 312. The fuel modification unit may be configured to adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives (e.g., the engines 10 of FIGS. 1 and 2).

By supplying fuel from the fuel storage tank to the locomotive engines and the engine of the fuel tender, the fuel may be combusted by the engines distributed across the train. In another non-limiting embodiment, the fuel tender engine may be further configured to generate electricity that may be delivered to one or more components on-board the fuel tender and/or on-board the locomotives. In one example, as depicted in FIG. 3, the fuel tender engine may generate torque that is transmitted to a power conversion unit 314 via drive shaft 316. The power conversion unit is configured to convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

In one example, the power conversion unit includes an alternator (not shown) that is connected in series to one or more rectifiers (not shown) that convert the alternator's AC electrical output to DC electrical power prior to transmission along the electrical bus. Based on the configuration of a downstream electrical component receiving power from the electrical bus, one or more inverters may be configured to invert the electrical power from the electrical bus prior to supplying electrical power to the downstream component. In one example, a single inverter may supply AC electrical power from a DC electrical bus to a plurality of components.

In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may also monitor fuel tender operating parameters in active operation, idle, and shutdown states. Such parameters may include, but are not limited to, the pressure and temperature of the fuel storage tank, a pressure and temperature of the fuel modification unit, the fuel tender engine temperature, pressure, and load, compressor pressure, heating fluid temperature and pressure, ambient air temperature, and the like. In one example, computer readable storage media configured in the fuel tender controller may execute code to auto-stop, auto-start, operate, and/or tune the engine and the fuel modification unit in response to one or more control system routines. The computer readable storage media may also execute code to transmit to and receive communications from the engine controllers on-board the locomotives.

The fuel tender depicted in FIG. 3 is a non-limiting example of how the fuel tender may be configured. In other examples, the fuel tender may include additional or alternative components. As an example, the fuel tender may further include one or more additional sensors, flow meters, control valves, various other device and mechanisms for controlling fuel delivery and storage conditions, etc.

Figure 4:
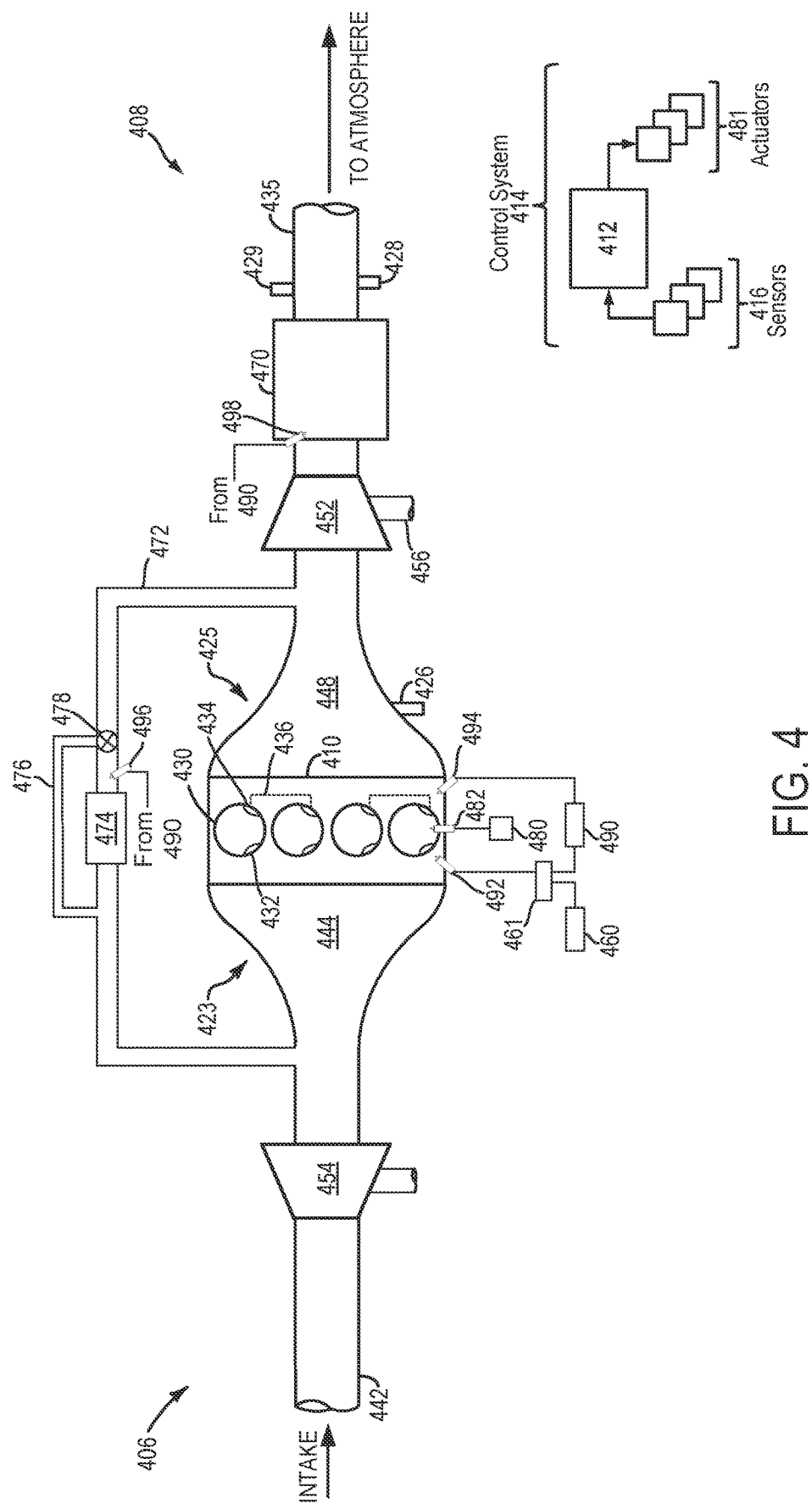
FIG. 4 shows a detailed view of an engine system.
Figure 5:
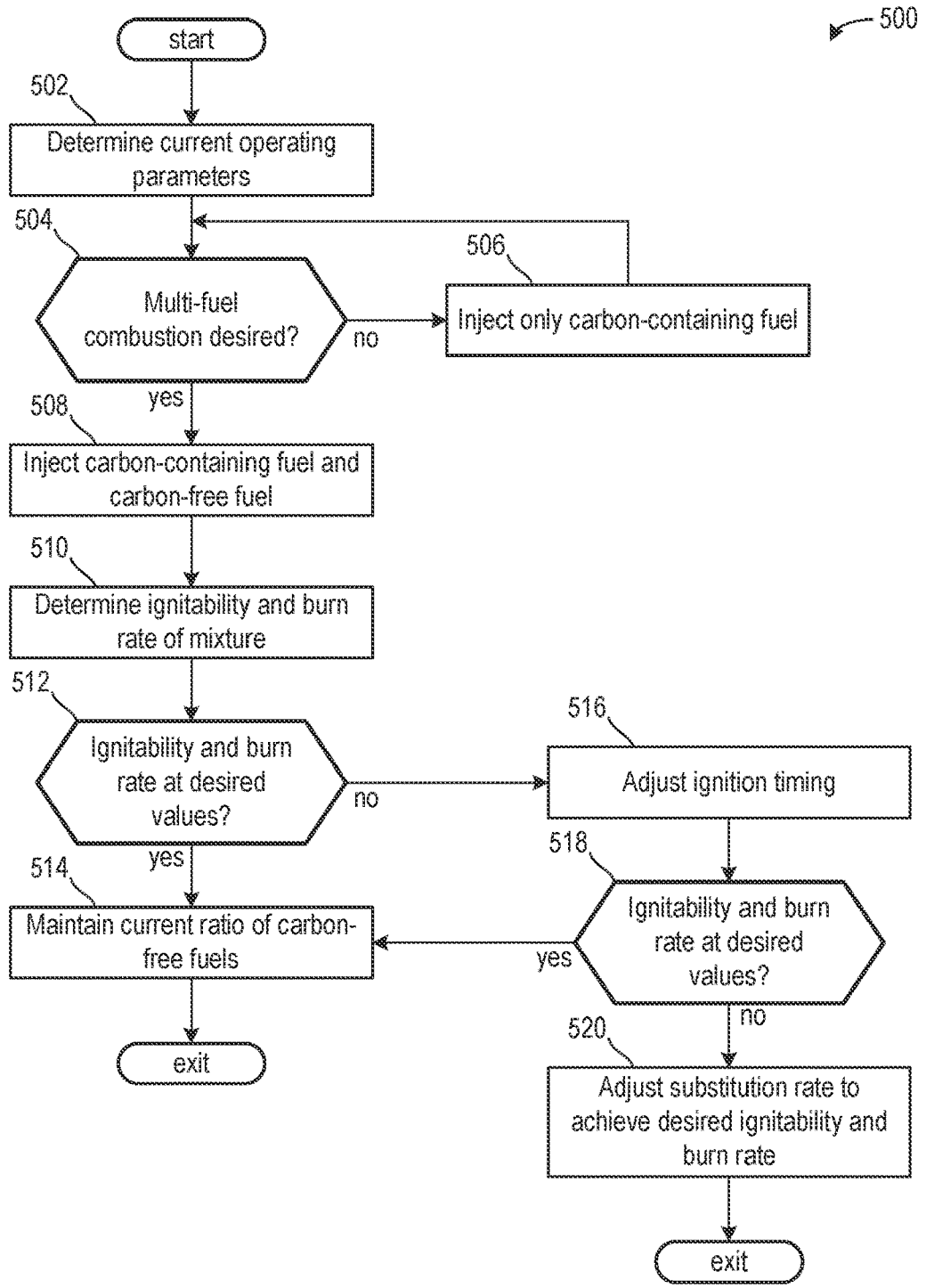
FIG. 5 shows a method for determining if multi-fuel combustion in the engine is desired and adjusting a substitution ratio thereof.
Figure 6:
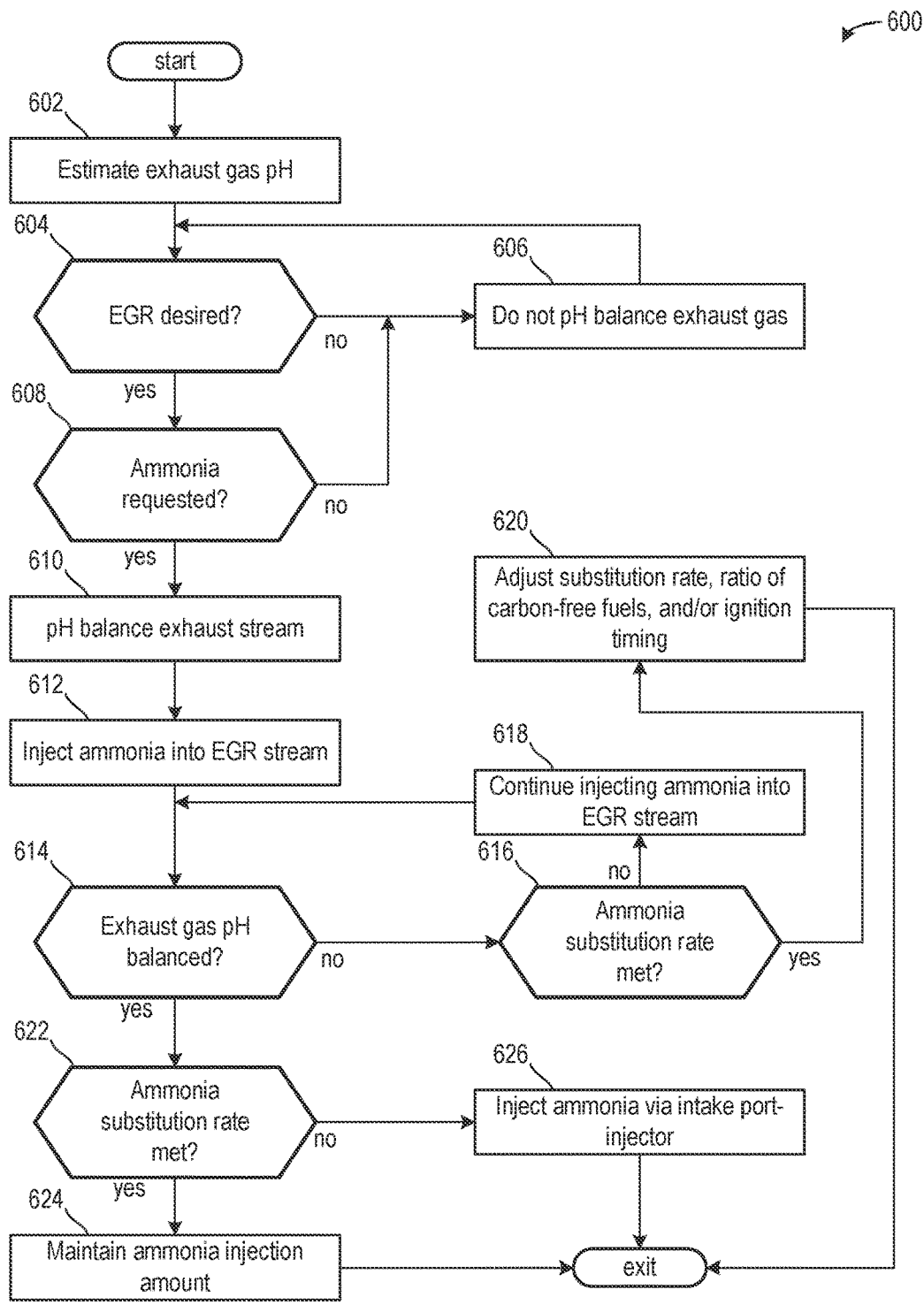
FIG. 6 shows a method for pH balancing exhaust gas

A more detailed view of the engine, injectors of the fuel system, and the aftertreatment system is shown in FIG. 4. A controller of the vehicle system may use a plurality of different control strategies to adjust exhaust valve timing, diesel injection timing, and ammonia injection location based on substitution ratios, engine temperatures, and exhaust temperatures, as shown in the methods of FIGS. 5 and 6. An example operating sequence is plotted in FIG. 7.

FIG. 4 shows a schematic depiction of a vehicle system 406 that may be a non-limiting example a rail vehicle of FIG. 1. The vehicle system may be a hybrid that can derive propulsion power from engine system 408 and/or an on-board energy storage device. An energy conversion device, such as a generator, may be operated to absorb energy from vehicle motion and/or engine operation, and then convert the absorbed energy to an energy form suitable for storage by the energy storage device.

A suitable engine system may include an engine 410 having a plurality of cylinders 430. Each cylinder may include an intake valve 432 and an exhaust valve 434. Each cylinder may receive a fuel injection from one or more fuel injectors. For example, each cylinder may include a direct fuel injector 482 coupled to a first fuel tank 480. The engine may be a multi-fuel engine configured to combust multiple types of fuels separately or in combination. In one example, injections of the various fuels may occur at different locations of the engine system. For example, the engine may optionally include one or more of an intake port injector 492 and an exhaust port injector 494 coupled to a second fuel tank 490. The first fuel tank may house a first fuel and the second fuel tank may house a second fuel. The first fuel may include a carbon-containing fuel and the second fuel may supply a carbon-free fuel. In one example, the carbon-containing fuel may include one of gasoline, diesel, biodiesel, natural gas, HDRD, and alcohol. The carbon-free fuel may include one or more of ammonia and hydrogen. In some examples, the engine may be a compression-ignition engine.

In other examples, the engine may be a spark-ignited engine. Additionally or alternatively, the second fuel may include a fuel with a lower carbon content than the first fuel.

The intake port injector may be further configured to receive fuel from a third fuel tank 460. The third fuel tank may comprise a third fuel type, such as hydrogen. In one example, a fuel rail 461 may receive fuel from each of the third fuel tank and the second fuel tank and distribute the fuel to the intake port injector. In some examples, the fuel rail may flow the fuels separately via a valve or other element arranged therein. Additionally or alternatively, the fuel rail may mix the second and third fuels within a mixing valve, a mixing chamber, or a fuel line thereof.

In some examples, additionally or alternatively, the intake injectors may include a plurality of second fuel intake injectors and a plurality of third fuel intake injectors. The plurality of second fuel intake injectors may receive fuel from only the second fuel tank and the plurality of third fuel intake injectors may receive fuel from only the third fuel tank. In this way, the second and third fuels injection timings may be adjusted individually, which may promote usage of the second and third fuels across a greater range of conditions.

In some examples, additionally or alternatively, the intake port injector, the direct injector, and/or the exhaust port injector may each be configured to inject gasoline, diesel, hydrogenation-derived renewable diesel (HDRD), alcohol, ammonia, biodiesels, hydrogen, natural gas, kerosene, or syn-gas.

The intake port injector may be positioned to inject ammonia or hydrogen or other fuel into an intake port of the engine. The exhaust port injector may be positioned to inject ammonia, alcohols, water, or other fuel into an exhaust port of the engine. Additionally or alternatively, the exhaust port injector may be configured to inject other fuels with low ignitibility. In one example, the ammonia injection from the exhaust port injector may contact and accumulate onto the exhaust valve, which may provide a cooling effect thereto. In some examples, the exhaust valve timing and/or injection timing may be adjusted to adjust an amount of contact between the exhaust valve and the ammonia injection. In one example, when multi-fuel combustion is desired, an amount of ammonia injected via the exhaust port injector may be proportional to a desired exhaust valve cooling. For example, the amount of ammonia injected may increase in response to the desired exhaust valve cooling increasing. In some examples, additionally or alternatively, the substitution ratio may increase in response to the desired exhaust valve cooling increasing.

Water may be captured from the exhaust gas as a result of combustion of the diesel and hydrogen fuels and stored in a reservoir, in one example. Water may be provided to the combustion mixture by enhancing a dilution of the mixture to decrease the likelihood of knock, in one example. Additionally or alternatively, water may be injected toward the exhaust valve, similar to ammonia as described above, to provide a cooling effect thereto. Additionally or alternatively, condensate from various location of an engine system, such as the EGR cooler, may be swept to the engine. An amount of condensate swept to the engine may be adjusted by adjusting a routing of the EGR stream. For example, flowing EGR from a dedicated EGR cylinder (e.g., a donor cylinder) or by adjusting the exhaust valve timing may decrease condensate flow to the engine while meeting an EGR demand.

As another example, the amount of ammonia injected may be based on a desired ignitability and burn rate of a fuel combustion mixture. For example, if hydrogen, ammonia, and diesel are included in a current substitution ratio, then a ratio of the hydrogen and ammonia may be adjusted to mitigate knock and pre-combustion while also meeting the desired ignitability and burn rate. Furthermore, an ignitability of the fuel combustion mixture may be adjusted to mitigate knock and pre-combustion while still meeting a desired combustion phasing relative to the engine cycle.

The engine includes an engine intake 423 and an engine exhaust 425. The engine intake includes an intake passage 442 fluidly coupled to an engine intake manifold 444. The engine exhaust includes an exhaust manifold 448 leading to an exhaust passage 435 that routes exhaust gas to the atmosphere. Optionally, one or more of the cylinders may be interconnected such that exhaust gases from one cylinder may flow to another cylinder. In one example, passages 436 may connect two or more cylinders such that exhaust gases of a first cylinder may be routed to a second cylinder without entering the exhaust manifold or the exhaust passage. In one example, the first cylinder is a donor cylinder configured to supply EGR internally.

Various surfaces of the engine, the cylinders, the intake manifold, and the exhaust manifold may be galvanized with a coating of zinc. The surfaces may be galvanized due to exhaust gas constituents dissolving into water contained therein. For example, $CO_2$ may dissolve into water along with NO constituents. The $CO_2$ and $NO_x$ constituents may protonate into acidic compounds, which along with the $CO_2$ may decrease a pH of the exhaust gas, thereby increasing an acidity of the exhaust gas. At certain EGR flow rates, the exhaust gas may be corrosive. The water content of the exhaust gas may be increased during operating conditions where hydrogen is being combusted. By galvanizing the engine, the corrosiveness of the exhaust gas may be tolerated. Methods for reducing an acidity of the exhaust gas are described with respect to FIG. 6.

Engine exhaust may include one or more emission control devices 470 mounted in a close-coupled position or in a far underbody position. The one or more emission control devices may include a three-way catalyst, lean $NO_x$ trap, diesel particulate filter, oxidation catalyst, SCR device, etc. In one example, a catalyst injector 498 may be positioned upstream of the one or more emission control devices. In one example, the one or more emission control devices include at least the SCR device (or a plurality of SCR devices), wherein the catalyst injector may replenish an amount of reductant therein. The catalyst injector may be coupled to the second fuel tank when the second fuel is ammonia. If the second fuel system is an ammonia fuel system, then a urea system for reducing the SCR device may be omitted and ammonia injected by the catalyst injector may reduce the SCR device. This may decrease packaging constraints and manufacturing costs.

An EGR passage 472 may branch from the exhaust passage at a junction (e.g., an intersection) upstream of a turbine 452. The EGR passage may house an optional EGR cooler 474 and a cooler bypass 476. An EGR valve 478 may control an amount of EGR flow to the intake passage downstream of a compressor 454. The turbine may be mechanically coupled to the compressor via a shaft 456, similar to the turbocharger of FIG. 2. Thus, in the example of FIG. 4, the EGR passage is a high-pressure (HP) EGR passage configured to direct exhaust gases from upstream of the turbine to a portion of the intake downstream of the compressor. The EGR passage may further include an EGR passage injector 496 coupled to the second fuel tank. In one example, the EGR passage injector may be arranged upstream of an EGR cooler inlet and downstream of the cooler bypass relative to a direction of exhaust gas flow. In another example, additionally or alternatively, the EGR passage injector may be arranged within a threshold distance from which the EGR passage branches from the exhaust passage, upstream of the cooler bypass. The threshold distance may be equal to a non-zero, positive value and may be based on a temperature decay or thermal degradation of exhaust gas through the EGR passage. For example, the EGR passage injector may be positioned near or adjacent to the junction between the exhaust passage and the EGR passage where exhaust gas temperature decay is lowest or lower than a threshold decay. The EGR passage injector may be positioned to inject in a direction acutely angled or parallel to exhaust gas flow in the EGR passage. The EGR passage injector may provide some amount of EGR cooling such that an EGR cooler usage may be reduced, thereby decreasing a size or increasing a longevity of the EGR cooler. In some examples, the EGR cooler bypass may be omitted.

In some examples, the EGR passage may be configured without the EGR cooler. In such examples, EGR cooling may be provided via only the EGR passage injector. For example, when EGR cooling is desired, the EGR passage injector may be activated, wherein an amount of ammonia injected therewith may be based on a desired EGR cooling. Additionally or alternatively, the amount of ammonia injected may be based on a currently allowed substitution ratio and/or a reductant load of the SCR device. As an example, if the amount of ammonia demanded for EGR cooling is greater than an amount allowed based on the currently allowed substitution ratio, then an EGR flow rate may be reduced such that the amount of ammonia permissible based on the currently allowed substitution ratio is sufficient to cool the EGR.

In some examples, additionally or alternatively, the EGR and the ammonia may be premixed via injecting the ammonia into the EGR passage. The amount injected may be set based on the desired EGR cooling. If the amount injected is greater than the current substitution ratio, then the premixed EGR and ammonia may flow to a storage device to be consumed during future driving conditions.

In some examples, additionally or alternatively, ammonia may be used as coolant within the EGR cooler. For example, ammonia from the second fuel tank may flow to pipes of the EGR cooler in thermal communication with EGR flowing through the EGR cooler. The heated ammonia may be returned to the second fuel tank or sent to a fuel rail coupled to one or more of the intake port injector, the exhaust port injector, and the EGR passage injector. The heated ammonia may vaporize more efficiently upon being injected relative to cooler ammonia.

In some examples, additionally or alternatively, one or more $NO_x$ sensors may be spaced about the SCR device. For example, a first $NO_x$ sensor may be arranged upstream of the SCR device and downstream of the EGR passage relative to a direction of exhaust gas flow. A second $NO_x$ sensor may be arranged downstream of the SCR device. The $NO_x$ sensors may detect an amount of $NO_x$ and ammonia in the exhaust gas, wherein the second $NO_x$ sensor may sense a $NO_x$/ammonia slip through the SCR device. In some examples, the substitution ratio, an ammonia injection amount via the exhaust port injector and the EGR passage injector, and an ammonia injection amount via the catalyst injector may be based on $NO_x$/ammonia slip through the SCR device. For example, as slip increases, then the substitution ratio may decrease. As slip decreases or is no longer present, then the substitution ratio may increase.

The vehicle system may further include a control system 414. The control system is shown receiving information from a plurality of sensors 416 (various examples of which are described herein) and sending control signals to a plurality of actuators 481 (various examples of which are described herein). As one example, the sensors may include an exhaust gas sensor 426 located upstream of the emission control device, a temperature sensor 428, and a pressure sensor 429. Other sensors such as additional pressure, temperature, AFR, and composition sensors may be coupled to various locations in the vehicle system. As another example, the actuators may include the air intake throttle.

A controller 412 may be configured as a conventional microcomputer including a microprocessor unit, input/output ports, read-only memory, random access memory, keep alive memory, a controller area network (CAN) bus, etc. In one example, the controller may be configured as a powertrain control module (PCM). The controller may be shifted between sleep and wake-up modes for additional energy efficiency. The controller may receive input data from the various sensors, process the input data, and trigger the various actuators in response to the processed input data based on instruction or code programmed therein corresponding to one or more routines.

Thus, an engine system may include a multi-fuel engine configured to combust one or more fuels. A first fuel system may provide a first fuel via direct injectors to cylinders of the engine. A second fuel system may provide a second fuel via a variety of injectors including intake port injectors, exhaust port injectors, a direct injector, and the EGR passage injector. A controller with instructions stored thereon may command adjustment of amounts of the second fuel injected by one or more of the injectors of the second fuel system based on one or more operating conditions described with respect to the methods below. During some operating modes, one or more of the injectors of the second fuel system may be used, wherein the controller may balance amounts of second fuel injected via the exhaust port injector, the EGR passage injector, and the intake passage injector. In one example, injections through the exhaust port injectors and the EGR passage injector may be prioritized over the intake passage injector. Prioritizing the exhaust port injectors and the EGR passage injector may include injecting a highest desired amount of second fuel via one or more of the EGR passage injector and the exhaust port injectors prior to injecting second fuel via the intake port injector.

The controller may further be configured to include a third fuel during some engine loads. For example, for a notch setting greater than or equal to 4, the substitution ratio may include hydrogen, ammonia, and diesel. For notch settings less than 4, the substitution ratio may include only hydrogen and diesel. An ignitability of the engine may be adjusted based on the substitution ratio, described in greater detail with respect to FIGS. 5-7.

The engine system may further include multiple methods of providing EGR. Herein, EGR is defined as an exhaust gas expelled from a cylinder and returned to the engine for combustion. EGR may be provided via a dedicated donor cylinder, an adjusted exhaust valve timing, and/or the EGR passage. The donor cylinder may expel exhaust gases from its interior volume and flow the exhaust gases to another cylinder fluidly coupled thereto. Additionally or alternatively, the donor cylinder may expel exhaust gases directly to the EGR passage. The adjusted exhaust valve timing may include where an exhaust valve opening may overlap with an intake valve opening, resulting in a vacuum of the cylinder drawing expelled exhaust gases back into the cylinder. In this way, the EGR rate may be set via the donor cylinder(s), the adjusted exhaust valve timing, and/or valve position in the EGR passage.

The engine system may further include adjusting a position at which alternative fuels are provided to the engine. For example, if exhaust valve cooling is desired, then an alternative fuel may be injected toward the exhaust valve via the exhaust port injectors. The alternative fuel may be selected based on heat capacity, heat of vaporization or an ignitibility thereof. For example, ammonia or an alcohol may be selected to simultaneously help cool the exhaust valve and vaporize the less ignitable fuel.

In another example of the present disclosure, an exhaust valve timing of the cylinders may be adjusted. In one example, the exhaust valve timing may be adjusted for a given cylinder such that a closing time of an exhaust valve during an exhaust stroke is advanced. Exhaust gases in the cylinder may be retained based on the advanced valve timing. By doing this, exhaust residuals may be increased.

In some examples, additionally or alternatively, the exhaust valve timing may be delayed such that the exhaust valve may be open with an intake valve of the cylinder during an intake stroke. By delaying the timing of exhaust valve closure, exhaust gases may be re-ingested into the cylinder. In one example, as the exhaust valve closure is more delayed, an amount of exhaust gas re-ingested into the cylinder increases, thereby increasing the EGR rate. Re-ingesting EGR may be desired during conditions where a higher in-cylinder mixture temperature is desired, for example when a fuel will be difficult to vaporize or combust (i.e., ammonia or ethanol). Exhaust re-ingestion may also be demanded to assist introduction of a fuel through the exhaust valve.

In some examples, the multi-fuel combustion may include injecting ammonia into the exhaust port. The amount of ammonia injected into the exhaust port may be based on one or more of a desired exhaust valve cooling and a substitution ratio. In one example, if the amount of ammonia demanded for cooling the exhaust valve is less than the amount of ammonia demanded for meeting the substitution ratio, then ammonia may also be injected into the intake port via the intake port injector. A balance between the amount of ammonia injected into the intake port and the exhaust port may be based on one or more of an engine temperature, an exhaust temperature, an exhaust valve timing, an exhaust valve temperature, and an exhaust gas pH. An amount of ammonia injected into the exhaust port may increase as one or more of the exhaust temperature increases, the exhaust valve timing becomes more delayed, the exhaust valve temperature increases, and the exhaust gas pH decreases. As the amount of ammonia injected into the exhaust port increases, the amount of ammonia injected into the intake port may decrease. In another example, the amount of ammonia injected into the exhaust port may be based on the ignitability of the cylinder contents. For conditions where the fuel-air mixture (e.g. ammonia-air mixture) is easily ignited, less fuel may be injected into the exhaust port. For conditions where the fuel-air mixture is not easily ignited, more fuel may be injected through the exhaust port.

Some examples of the system may further include injecting ammonia into the exhaust port. The amount of ammonia injected may be based on one or more of the desired exhaust valve cooling, the SCR reductant demand, and the substitution ratio. If the amount of ammonia desired for the exhaust valve cooling/fuel heating and the SCR reductant demand is less than the substitution ratio, then the intake port injector may be activated to inject a remaining amount of ammonia as described above. If the amount of ammonia desired for the exhaust valve cooling/fuel heating and the SCR reductant demand is greater than the substitution ratio, then the exhaust port injection of the ammonia may be equal to the substitution ratio in combination with the SCR reductant demand.

During a baseline exhaust valve timing, injecting onto the exhaust valve may carry the accumulated fuel away from the cylinder and into the exhaust manifold/aftertreatment device. As such, the fuel is not included in the combustion mixture. To include the fuel injected toward the exhaust valve in the combustion mixture, the fuel may be injected after the exhaust stroke has ended. The exhaust valve may be kept open during the intake stroke such that the fuel may enter the cylinder through the exhaust port. In some examples, there may be delay between injecting fuel for the aftertreatment device and injecting fuel for the combustion mixture such that the desired amount of fuel still flows to the aftertreatment device.

Turning now to FIG. 5, a high-level flowchart shows a method 500 for determining if multi-fuel combustion is desired. The method may be executed by a controller of a vehicle, such as the controller of FIGS. 1-4, based on instructions stored in a memory of the controller.

The method may begin at step 502, where the method may include estimating and/or measuring vehicle operating parameters and/or conditions. Vehicle operating parameters and/or conditions may be estimated based on one or more outputs of various sensors of the vehicle (e.g., such as one or more exhaust temperature sensors, an engine speed, a wheel speed, and/or a turbo shaft speed sensor, a torque sensor, a manifold pressure sensor, etc., as described above in reference to the vehicle system of FIGS. 1-4). Vehicle operating conditions may include engine velocity and engine load, vehicle velocity, transmission oil temperature, exhaust gas flow rate, mass air flow rate, coolant temperature, coolant flow rate, engine oil pressures (e.g., oil gallery pressures), operating modes of one or more intake valves and/or one or more exhaust valves, electric motor velocity, battery charge, engine torque output, vehicle wheel torque, and the like.

At step 504, the method may include determining if multi-fuel combustion is desired. Multi-fuel combustion may be desired based on a multitude of conditions including but not limited to one or more of an emission target, a fuel cost, a combustion mixture efficiency, and a fuel availability. The emission target may be based on an individual vehicle emission target based on a government standard. Additionally or alternatively, the emission target may be based on a local government standard for a geofenced location. For example, a city may include a different emission target than a rural location. A combustion mixture may be customized for a plurality of vehicles operating in the city such that total emissions from the plurality of vehicles may meet local emission targets. By doing this, emission targets of individual vehicles may be exceeded at certain operating points to balance emissions of the plurality of vehicles to meet local emission targets.

In some examples, multi-fuel combustion may be desired based on fuel cost. The fuel cost may be determined via feedback from one or more of a plurality of vehicles, refueling stations, vehicle operators, and so on. An average fuel cost may be determined for each type of fuel included in the consist. For example, if the consist includes diesel, hydrogen, ammonia, and ethanol, costs for each of the fuel types may be determined and a combustion mixture may be adjusted based on at least the costs of the fuel types. In one example, it may be desired to minimize the cost of the combustion mixture.

In further examples, additionally or alternatively, the engine efficiency may dictate a combustion mixture. The engine may be adjusted to maximize the engine efficiency in one example. In other example, the combustion mixture may be adjusted to maximize an engine power output. A vehicle operator may select to prioritize engine power output or the engine efficiency.

In still further examples, additionally or alternatively, the combustion mixture may be adjusted in response to the fuel availability. In certain locations, one or more of the fuels included in the consist may include a low availability. Consumption of a fuel with low availability may be reduced in some examples. Consumption of a fuel with higher availability may be increased. Fuel availability may be determined based on feedback from a plurality of vehicles and refueling stations. The availability may be determined based on a range from a current location of the vehicle. The range may be equal to a miles remaining based on current fuel levels.

Multi-fuel combustion may include combustion of at least a primary fuel and a secondary fuel. In one example, the primary fuel may be a carbon-containing fuel and the secondary fuel may be a carbon-free fuel including less carbon per molecule than the carbon-containing fuel. Multi-fuel combustion may decrease $CO_2$ and/or NO emissions of the vehicle by increasing an amount of the secondary fuel and decreasing an amount of the primary fuel. In one example, the multi-fuel combustion may include diesel as the primary fuel and hydrogen as the secondary fuel. Conditions that may impact a substitution ratio may include engine airflow, engine load, intake manifold temperature, ambient pressure and ambient temperature, and exhaust manifold pressure. The substitution ratio may be defined as a percentage of total fuel energy provided by the secondary fuel. For example, if the desired substitution ratio is 60%, then the secondary fuel may provide 60% of the fuel energy and diesel may provide 40% of the fuel energy. In one example, an amount of carbon-free fuel increases as the substitution ratio increases.

Additionally or alternatively, in some examples, the desired substitution ratio may be adjusted in response to carbon emissions (e.g., $CO_2$, hydrocarbons, and other carbon containing combustion byproducts) and/or NO emissions. For example, as carbon emissions increase, then it may be desired to increase the substitution ratio. Alternatively, as combustion efficiency decreases, it may be desired to decrease the substitution ratio. Additionally or alternatively, a vehicle controller may select whether multi-fuel combustion is desired based on fuel availability. For example, certain locations may not include fuel stations including alternative fuels such as HDRD, ammonia, hydrogen, and the like. The vehicle controller may request combustion of a single fuel, e.g., if other sources of fuel are not available at local fuel stations. The vehicle controller may be onboard or offboard the vehicle, depending on the selected configuration. In one embodiment, the vehicle controller is an operator that is located onboard the vehicle during operation. As another example, multi-fuel combustion may be desired based on fuel costs. Average fuel costs may be determined via a processor of a central server receiving feedback from controllers of a plurality of controllers of different vehicle systems. The average fuel costs may be determined for each fuel type within various geofenced areas, wherein geofenced areas may include streets, cities, schools, zip codes, states, radii from a current vehicle location, and landmarks.

If multi-fuel combustion is not desired, then at step 506, the method may include injecting only the carbon-containing fuel. A substitution ratio may be set to zero. The controller may signal to the direct injector of the engine to inject the carbon-containing fuel. The controller may further signal to deactivate injectors configured to inject secondary fuels.

If multi-fuel combustion is desired, then at step 508, the method may include injecting at least one carbon-containing fuel and one or more of the carbon-free fuels. A substitution ratio may be selected based on an engine load, in one example, wherein the engine load may be proportional to a notch setting, such as a setting of throttle 142 of FIG. 2. In one example, the carbon-containing fuel may be injected via only the direct injector. The one or more carbon-free fuels may be injected and delivered to the engine via one or more of the intake port injector, the exhaust port injector, and the EGR passage injector. A mixture of the fuels may be selected based on an engine load. The mixture may include another carbon-containing fuel. In one example, the mixture may include where one or more of the carbon-containing fuels is a renewable carbon-containing fuel, such as ethanol, HDRD, and biodiesel. In one example, the mixture may be optimized to decrease usage of the carbon-containing fuels while meeting various combustion conditions. Proportions of the carbon-free fuels may be adjusted relative to one another while still meeting a substitution ratio.

For example, based on a notch setting of the engine, which may be proportional to engine load or vehicle speed, different substitution ratios may be desired. For lower engine loads, the one or more carbon-free fuels may include only hydrogen or mostly hydrogen with relatively low amounts of ammonia. Substitution ratios at lower engine loads with hydrogen may be greater than 50%, or greater than 65%, or greater than 80%. In this way, usage of the carbon-containing fuel may be reduced. At higher engine loads, the one or more carbon-free fuels may include hydrogen and ammonia. Ammonia may be desired at higher engine loads due to the reactivity (e.g., ignitibility) of hydrogen. Ammonia may be less combustible than hydrogen under certain combustion conditions, which may allow a greater substitution ratio at higher engine loads compared to use of hydrogen alone, thereby decreasing consumption of the carbon-containing fuel. In one example, at higher engine loads, an amount of ammonia consumed may exceed an amount of hydrogen consumed. Thus, in one example, as the engine load decreases, an amount of hydrogen may increase and an amount of ammonia may decrease while an overall substitution ratio may be relatively stable. As the engine load increases, the amount of hydrogen may decrease and the amount of ammonia may increase.

Across the engine loads, ethanol may be included in the combustion mixture. Other renewable fuels (e.g., carbon neutral fuels) such as HDRD and biodiesel may be used in combination with hydrogen and ammonia. The ignition timing of the mixture may be determined and adjusted based on all the fuels included in the combustion mixture, as described below. Renewable, low carbon, or carbon-neutral fuels described herein refers to fuels that can be generated without net production of carbon-based emissions or with a lower net production of greenhouse gases (GHG)/carbon emissions. For example, hydrogen can be produced from electrolysis using solar-generated power free of carbon in the production/use cycle or biodiesel may be produced from plant-based oils. The plants absorb $CO_2$ from the atmosphere which may offset $CO_2$ emitted during combustion or result in a net $CO_2$ used being less than fossil fuels or other hydrocarbon based fuels. However, as described here, the multi-fuel engine may combust with a plurality of fuels regardless of the source of fuel. For example, depending of fuel availability, hydrogen produced through a more carbon intensive process (e.g., grey hydrogen) or ammonia produced from methane may be used.

The amount of non-renewable carbon-containing fuel may be set to a lowest possible amount during all engine loads to decrease emissions. The lowest possible value may be based on one or more of $NO_x$ emissions, $CO_2$ emissions, fuel prices, fuel availability, and vehicle travel time to a desired destination. As one example, the lowest possible amount may increase if fuel availability of hydrogen and/or ammonia is relatively low. As another example, the lowest possible value may decrease if $CO_2$ or $NO_x$ emissions are relatively high. Thus, the lowest possible value may be a dynamic value based on the above described conditions along with various combustion condition target values.

At step 510, the method includes determining an ignitability and a burn rate of the mixture. The ignitability refers to a propensity of an element to combust. A higher ignitability may correspond with a greater propensity to combust. The burn rate is defined as a time needed for a flame front of an element or mixture to travel from a first location to a second location. In an example where ammonia and hydrogen are included in a combustion mixture as the carbon-free fuels, the hydrogen is more ignitable and may include a higher burn rate than ammonia. Based on current engine temperatures and cylinder pressures, the amounts of ammonia and hydrogen may be adjusted to meet desired ignitability and burn rate values for a mixture thereof along with the carbon-containing fuel.

In some examples, additionally or alternatively, the method may further include determining an ignition timing of the combustion mixture. Conditions that may influence ignition timing may include a pilot injection timing and/or a spark timing. Other conditions that may further influence ignition timing may include the combustion mixture, burn rate and ignitability of the combustion mixture, intake valve timing, fuel injection timing, fuel temperature, fuel pressure, engine speed, engine load, air temperature, engine temperature, and boost pressure and/or manifold pressure. The ignition timing may be compared to a desired ignition timing, wherein if the ignition timing deviates from the desired ignition timing, then the ignition timing may be adjusted by adjusting one or more of the above conditions prior to adjusting the substitution ratio.

At step 512, the method includes comparing the ignitability and the burn rate of the mixture to desired values. The ignitability and burn rate may be calculated based on one or more of an in-cylinder pressure, an intake manifold temperature, an intake manifold pressure, and an air flow rate. The in-cylinder pressure may be estimated based on one or more of an exhaust gas temperature, an exhaust gas pressure, an intake manifold pressure, an intake manifold temperature, a compressor pressure ratio/outlet pressure, and an engine temperature. Additionally or alternatively, an in-cylinder pressure sensor may be positioned and configured to sense the in-cylinder pressure. The intake manifold temperature may be sensed via a temperature sensor or estimated based on one or more current engine operating conditions, such as engine speed, engine temperature, and substitution ratio. The intake manifold pressure may be sensed via a pressure sensor, such as a manifold pressure sensor, or estimated based on the intake manifold temperature and/or one or more current engine operating conditions. The air flow rate may be sensed via a mass airflow sensor and/or estimated based on the intake manifold temperature and pressure. A knock sensor may be positioned to sense engine vibrations and transmit feedback to the controller indicating if knock has occurred. As another example, power output may be compared to an expected power output, which may be proportional to fuel supplied. Variations in pressure or power output between engine cycles (e.g., cycle-to-cycle variability) may be used to gauge the ignitability and burn rate. Other data that may be used to measure the ignitability and the burn rate may include emissions data, an exhaust temperature, a turbo speed, and/or a model combining two or more of the above described parameters. If one or more of the measured, calculated, or estimated values is different than a desired value, then the ignitability and burn rate of the mixture may be different than desired values. For example, if a peak in-cylinder pressure is reached during a compression stroke or another time prior to near TDC of the combustion stroke, then the ignitability and/or burn rate of the mixture may be too high. As such, an amount of hydrogen may be reduced and an amount of ammonia may be increased. Additionally or alternatively, prior to adjusting, a magnitude of the adjustment may be based on a timing difference between when the peak in-cylinder pressure is achieved (e.g., an actual timing), and when the peak in-cylinder pressure is desired (e.g., near TDC of the combustion stroke). For example, as the timing difference increases, then the magnitude of the adjustment may increase, resulting in a further reduction of hydrogen and increase of ammonia relative to a lower timing difference.

Furthermore, if the ignitability and burn rate are too high, then a likelihood of knock and pre-combustion may be increased. To mitigate knock and pre-combustion, it may be desired to decrease the ignitability and burn rate of a combustion mixture. For example, at higher loads where engine temperatures are higher, an amount of hydrogen may be reduced and an amount of ammonia may be increased to mitigate knock and pre-combustion. In one example, higher loads may include only ammonia and diesel due to an elevated likelihood of knock. At lower loads, the amount of hydrogen may be increased and the amount of ammonia may be decreased to increase the ignitibility and burn rate. In one example, lower loads may include only hydrogen and diesel due to ignitability of a combustion mixture being reduced. Knock and pre-combustion may be less likely at lower loads due to lower engine temperatures and/or lower air flow rates.

As another example, if a peak in-cylinder pressure is not reached or reached after near TDC of the combustion stroke, or if the unburned fuel emissions are excessive or if the cycle-to-cycle variability of the combustion event is too high, then the ignitability and/or burn rate of the mixture may be too low. An amount of ammonia may be reduced and an amount of hydrogen may be increased. In one example, the amount in which ammonia is adjusted may be proportional to a difference between the peak in-cylinder pressure and a maximum allowable peak cylinder pressure. Additionally or alternatively, a magnitude of the reduction of ammonia may be based on the timing difference between a desired peak in-cylinder timing and an actual timing, as described above.

If the ignitability and burn rate are equal to desired values, then at step 514, the method includes maintaining a current ratio of carbon-free fuels. Additionally or alternatively, the ignition timing may not be adjusted.

If the ignitability and burn rate are not equal to desired values, then at step 516, the method may include adjusting the ignitability and burn rate. As described above, the amounts of ammonia and hydrogen may be adjusted based on the ignitability and burn rate of the mixture, estimated based on in-cylinder pressures, knock sensor feedback, intake manifold temperatures, unburned fuel emissions, cycle-to-cycle variability, and other parameters described above. If the ignitability and burn rate are too low, then the amount of hydrogen may be increased and the amount of ammonia may be decreased. If the ignitability and burn rate are too high, then the amount of hydrogen may be decreased and the amount of ammonia may be increased.

To further adjust the ignition timing, the injection timing of the fuels may be adjusted. For example, a diesel injection timing may be retarded if the ignition timing is earlier than a desired ignition timing. The diesel injection timing may be further adjusted based on hydrogen being port-injected or direct injected.

Additionally or alternatively, if the ignitability and/or burn rate is higher than desired, then an EGR rate may be increased. EGR may be provided via the EGR passage, a donor cylinder, and/or via the adjusted exhaust valve timing, which may provide a greater fine-tuning of the ignitability and burn rate. Additionally or alternatively, ammonia may be mixed with the EGR to further decrease the ignitability and burn rate.

If the ignition timing is delayed relative to the desired ignition timing based on a diesel injection timing or spark timing. An injection timing of diesel or other carbon-containing fuels may be advanced to increase an ignitability of the ammonia. For example, the diesel injection may include a main injection and a pilot injection, wherein a timing of the pilot injection may be similar to an ammonia injection to increase the ignitibility of the ammonia. The main injection may occur during a compression stroke. In one example, a fuel mass of the pilot and main injections may be adjusted. For example, the mass of the pilot injection may be increased and the mass of the main injection may be decreased to further advance the ignition timing.

In some examples, additionally or alternatively, the ammonia may be used as a coolant in the EGR cooler. By doing this, the ammonia may be heated via exhaust gases and then provided to the engine. The hotter ammonia may be more combustible than cooler ammonia. Additionally or alternatively, the ammonia may be injected toward the exhaust valve as described above, the effect of which may include an advanced ammonia injection timing along with increased mixing with hot exhaust gases, thereby mitigating knock by reducing the ignitability and combustibility of the combustion mixture.

The total amount of carbon-containing fuel may be held constant until other conditions influencing ignitability and burn rate are adjusted. Thus, the substitution ratio may be maintained, the amount of carbon-free fuel relative to the amount of carbon-containing fuel remains fixed, unless the desired ignitability and burn rate may not be achieved through adjustments of the amounts of hydrogen and ammonia along with the various timing adjustments described above.

At step 518, the method determines if the ignitability and burn rate of the adjusted mixture composition are equal to desired values. If the ignitability and burn rate of the adjusted mixture composition are equal to the desired values, then the method proceeds to step 514, as described above. If the ignitability and burn rate of the adjusted mixture composition is different than the desired values, then at step 520, the method includes adjusting the substitution ratio to achieve a desired ignitability and burn rate. In one example, the substitution ratio may be reduced. Reduction of the substitution ratio may include decreasing amounts of one or more of the carbon-free fuels and increasing amounts of one or more of the carbon-containing fuels. As such, the substitution ratio which was selected based on one or more engine conditions including an engine load, may be adjusted due to a burn rate and/or ignitibility of the substitution ratio deviating from desired values due to one or more vehicles conditions.

Thus, in one example, a method for a multi-fuel engine system may include adjusting an ignitability based on a combustion mixture including two or more of diesel, hydrogenation-derived renewable diesel (HDRD), biodiesel, syngas, alcohol, gasoline, kerosene, ether, natural gas, ammonia, and hydrogen. The phasing of the combustion event relative to the position of the piston may be adjusted via adjusting amount of the various fuels, adjusting valve timings, injection timings, and other conditions to promote increased substitution ratios at a plurality of engine operating conditions. The ignitability may be tracked based on a manifold air flow rate, which may be proportional to a manifold pressure and temperature, engine temperature, engine speed, manifold humidity, and oxygen content in the exhaust gas.

Turning now to FIG. 6, it shows a method 600 for pH balancing exhaust gases when EGR is desired. In one example, exhaust gas constituents may dissolve into water contained therein. For example, $CO_2$ and other $CO_2$ compounds may dissolve into water along with NO constituents. The $CO_2$ and NO constituents may protonate into acidic compounds, which along with the $CO_2$ may decrease a pH of the exhaust gas. At certain EGR flow rates, the exhaust gas may be corrosive. As described above, by galvanizing the engine, the corrosiveness of the exhaust gas may be tolerated. However, it may still be desired to reduce the acidity of the exhaust gas. The method may include injecting ammonia to neutralize an acidity of the exhaust gas. By doing this, ammonia may be injected into an EGR stream to reduce a likelihood of knock and corrosiveness of the EGR.

At step 602, the method includes estimating an exhaust gas pH. The exhaust gas pH may be sensed via a pH meter or estimated based on an exhaust gas composition. The exhaust gas composition may be based on a current substitution ratio, injection timing, and in-cylinder pressure. For example, the exhaust gas pH may be estimated to be lower (more acidic) if an amount of hydrogen being combusted is increased. As another example, the exhaust gas pH may be estimated to be higher (less acidic) if an amount of ammonia being combusted is increased. The exhaust gas pH may be further based on an estimated condensate load of the EGR cooler, wherein a higher condensate load may correspond to a more acidic or corrosive exhaust gas.

At step 604, the method includes determining if EGR is desired. EGR may be desired if engine temperatures are greater than a threshold temperature and/or if $NO_x$ emissions are greater than a desired amount of $NO_x$ emissions. EGR may further be desired based on an ignition timing, knock, of combustibility deviating from a desired amount. If EGR is not desired, then at step 606, the method may include not pH balancing the exhaust gas or condensate. As such, ammonia may not be injected into an exhaust gas stream to pH balance the exhaust gas. However, ammonia may still be injected into an exhaust stream for other reasons, such as cooling the exhaust gas and/or heating the ammonia to promote an ignitibility thereof.

If EGR is desired, then at step 608, the method includes determining if ammonia is desired. Ammonia may be desired during higher engine loads, as one example. Additionally or alternatively, ammonia may be desired based on a likelihood of knock and/or pre-combustion, which may be relatively high if an amount of hydrogen used is relatively high. If ammonia is not desired, then the method proceeds to step 606 as described above.

If ammonia is desired, then at step 610, the method may include pH balancing exhaust gas. In one example, the pH balancing may include injecting ammonia in an exhaust gas stream at step 612, wherein the exhaust gas stream is flowed to the engine as EGR. As such, the ammonia may be injected via the EGR passage injector and/or the exhaust port injector. Injection at the exhaust port injector may be timed with an exhaust valve timing such that the exhaust gas is reingested as EGR. Additionally or alternatively, the pH balancing may occur in tandem with a reductant request of an aftertreatment device, as described above. An amount of ammonia used to pH balance the exhaust gas may be proportional to the pH of the exhaust gas in combination with a water concentration thereof. As the pH decreases and/or as the water concentration increases, then the amount of ammonia increases. Additionally or alternatively, the amount of ammonia may increase in response to an amount of $NO_x$, CO, and $CO_2$ in the exhaust gas.

At step 614, the method includes determining if the exhaust gas is pH balanced. If the exhaust gas is not pH balanced, then at step 616, the method includes determining if an ammonia substitution ratio is met. The ammonia substitution ratio corresponds to an amount of ammonia included in the substitution ratio, wherein the substitution ratio may include other carbon-containing and carbon-free fuels.

If the ammonia substitution ratio is not met, then at step 618, the method includes continuing to inject ammonia into the EGR stream. If the ammonia substitution ratio is met, then at step 620, the method includes adjusting the substitution ratio, ratio of carbon-free fuels, and/or an ignition timing. In one example, the EGR flow rate may be less than a desired EGR flow rate due to a current acidity of the EGR. Less EGR may result in a likelihood of knock and pre-combustion being higher than desired. To mitigate knock, an amount of hydrogen may be decreased. Additionally or alternatively, one or more conditions influencing ignitability and burn rate may be adjusted, which may mitigate knock and pre-combustion.

Other adjustments to decrease the likelihood of knock may include injecting water into the intake manifold or directly into the cylinders of the engine. Water may be captured from the exhaust gas as a result of combustion of the diesel and hydrogen fuels and stored in a reservoir, in one example. A controller may signal to an actuator of a water injector to draw water from the reservoir and inject water into the intake manifold or directly into the cylinder. Additionally or alternatively, condensate from various location of an engine system, such as the EGR cooler, may be swept to the engine.

In some examples, adjustments may include injecting ethanol into the intake manifold or directly into the cylinders of the engine. Injecting ethanol may include decreasing one or more of hydrogen, diesel, ammonia, or air.

Returning to step 614, if the exhaust gas is pH balanced, then at step 622, the method includes determining if the ammonia substitution ratio is met. If the ammonia substitution ratio is met, then at step 624, the method includes maintain the ammonia injection amount. If the substitution ratio is not met, then at step 626, the method may include injecting ammonia via an intake port-injector. Additionally or alternatively, ammonia may continue to be injected into an exhaust stream via the EGR injector and/or the exhaust port injector.

Figure 7:
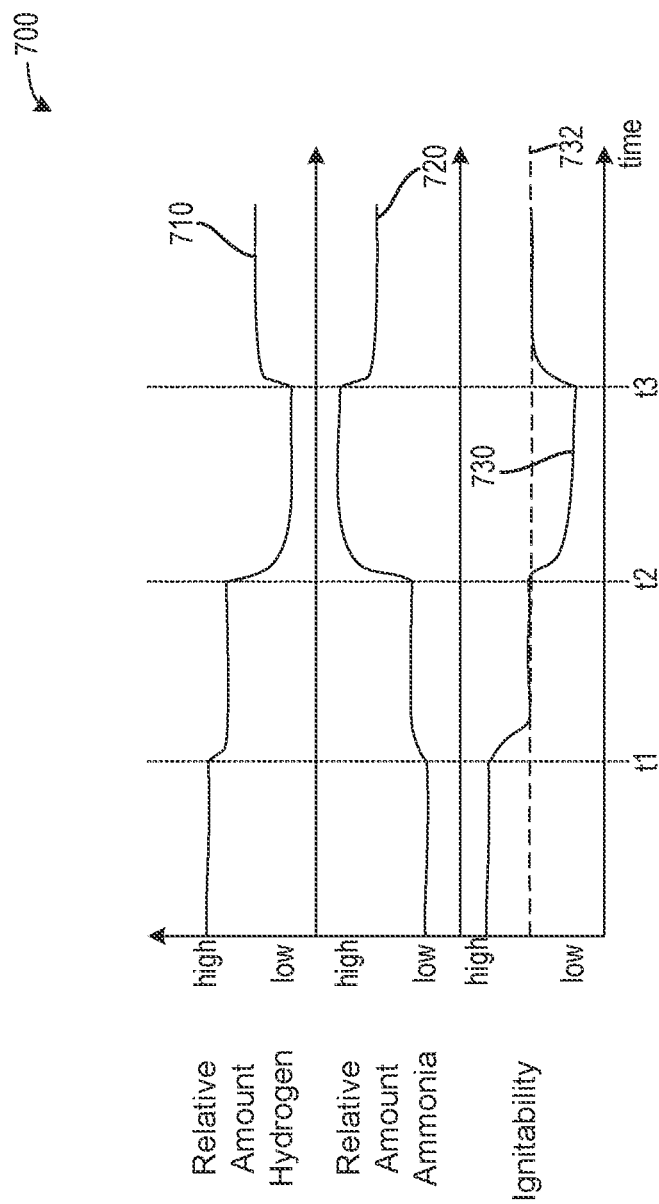
FIG. 7 shows a timeline illustrating adjustments to ignitability during multi-fuel operation of the engine.

Turning now to FIG. 7, it shows a timeline 700 graphically illustrating an engine operating sequence illustrating adjusting an ignition timing in response to a ratio of carbon-free fuels. Plot 710 illustrates a relative amount of hydrogen, plot 720 illustrates a relative amount of ammonia, and plot 730 illustrates an ignitability of the combustion mixture without adjustments. The amounts of hydrogen and ammonia are relative to one another. Dashed line 732 illustrates a desired ignitability. As described above, adjusting the ignitability may include adjusting amount of hydrogen and ammonia relative to one another based on a selected substitution ratio. Time increases along the abscissa.

Prior to t1, an amount of hydrogen is high relative to the maximum expected hydrogen amount for that engine power and an amount of ammonia is low relative to the maximum expected ammonia amount for that engine power. Thus, there may be more hydrogen provided to the engine than ammonia. An unadjusted ignitability and burn rate of the combustion mixture may be high relative to desired values due to the hydrogen amount being high. The desired values may be achieved via providing ammonia and/or EGR to the combustion mixture. An injection timing of diesel and/or the carbon containing fuel may be retarded to achieve a desired injection timing. Additionally or alternatively, an intake valve timing may be delayed, boost may be decreased, intake air flow may be reduced, and/or an amount of water provided to the engine may be increased. By doing this, a likelihood of knock and pre-combustion may be reduced.

In one example, prior to t1, the engine load may be relatively low (e.g., notch 3 or lower). Engine operating conditions may not be suitable for high amounts of ammonia. At t1, the engine load may increase (e.g., to notch 4 or 5 or 6). Between t1 and t2, the relative amount of hydrogen is reduced and the relative amount of ammonia is increased. In one example, a substitution ratio between t1 and t2 is equal to or within a threshold percentage of a substitution ratio prior to t1, however, a difference between fuel energy provided as hydrogen and ammonia is reduced. In one example, the threshold percentage is from 10 to 50%, or 10 to 30%, or 10 to 20%. The unadjusted ignitability and burn rate may be lower and closer to desired values. A magnitude of adjustments executed to decrease the ignitability and burn rate may be less than a magnitude of adjustments prior to t1. For example, an injection timing of diesel may be less retarded between t1 and t2 compared to prior to t1.

At t2, the engine load may continue to increase (e.g., to notch 7 or 8). Between t2 and t3, the relative amount of hydrogen is reduced to a relatively low amount and the relative amount of ammonia is increased to a relatively high amount. In one example, the substitution ratio between t2 and t3 is equal to or within the threshold percentage of the substitution ratio between t1 and t2 and/or the substitution ratio prior to t1. More fuel energy may be provided by ammonia than hydrogen. The ignitability of the combustion mixture decreases below the desired ignitability. At t3, the relative amount of hydrogen is increased and the relative amount of ammonia is decreased, resulting in the ignitability of the combustion mixture increasing to the desired ignitability, while maintaining the substitution ratio. After t3, the ratio of hydrogen and ammonia is maintained while meeting the substitution ratio.

Thus, a substitution ratio of a multi-fuel engine may be increased across a larger operating range. An ignitability and burn rate along based on amounts of ammonia and hydrogen may be adjusted to provide enhanced combustion conditions across a plurality of engine loads. By doing this, consumption of carbon-containing fuels may be reduced.

Turning now to FIG. 8, it shows a table 800 illustrating conditions of a first cylinder 810 and a second cylinder 820. In one example, the first cylinder and the second cylinder may be included in a plurality of cylinders of a multi-fuel engine, as shown in FIGS. 1-4. Row 830 illustrates an amount of water provided to each of the first cylinder and the second cylinder. The first cylinder may include a higher amount of water and the second cylinder may include a lower amount of water. The amount of water provided to each of the cylinders may be based at least partially on an EGR rate of the cylinders and a route in which EGR flows to the cylinders. As described above, EGR may be provided via the EGR passage, the donor cylinder, and re-ingestion/retention of exhaust gases. If the route includes the EGR passage, then the amount of water provided to the cylinder may be higher due to water condensing within the EGR cooler. If the route includes the donor cylinder or re-ingestion/retention of exhaust gases, then the water amount may be lower. Thus, in one example, the amount of water provided to the cylinders may be adjusted via adjusting the routing of the EGR. EGR may be routed through the EGR passage to increase the amount of water. Alternatively, EGR may be routed from the donor cylinder or reingested/retained to decrease the water amount. In one example, re-ingestion of exhaust gases may be more desired relative to other EGR stream routes if the ignitability of the combustion mixture is poor. As another example, routing through the EGR cooler may be more desired if knock is occurring or likely to occur. Routing through the EGR cooler may be further desired to reduce a condensate load of the cooler. The condensate swept therefrom may improve a dilution of the combustion mixture.

In one example, the amount of water may be estimated based on one or more engine operating conditions, an ambient temperature, an ambient humidity, an EGR rate, and an EGR route. Additionally or alternatively, the amount of water may be estimated based on one or more of an intake air humidity and an amount of oxygen in the exhaust gas. The amount of water provided to the cylinders may vary due to the route EGR is provided, but also due to a location of the cylinders. For example, for an inline cylinder arrangement, a first cylinder may receive more water than a last cylinder. Combustion conditions of the cylinders may be calibrated based on a learned water dispersion to the cylinders, wherein a water dispersion may be based on EGR flow rates, air flow rates, humidity, and the like.

Row 840 illustrates a substitution ratio of the cylinder. The first cylinder may include a higher substitution ratio and the second cylinder may include a lower substitution ratio. In this way, the substitution ratio may be proportional to the amount of water provided to each cylinder of the engine. The substitution ratio may be proportional to the amount of water due to a counterbalance between water and hydrogen. Water may mitigate knock and pre-combustion, which may allow a greater amount of hydrogen to be delivered to the cylinder.

Row 850 illustrates a primary fuel injection timing of the first cylinder and the second cylinder. In one example, the primary fuel is diesel. The earlier diesel injection timing may include injecting a pilot injection and a main injection, wherein the pilot injection is earlier than the main injection. In one example, the pilot injection may be injected during an intake stroke and the main injection may be injected during a compression stroke. The later primary fuel injection may include injecting only the main injection at or near TDC of the compression stroke.

The disclosure provides support for a method including adjusting a substitution ratio in response to an amount of water provided to a multi-fuel engine configured to combust a first fuel and a second fuel, the second fuel different than the first fuel. A first example of the method further includes the first fuel is a liquid fuel and the second fuel is a gaseous fuel, and wherein the amount of water is based on an amount of condensate in an EGR cooler. A second example of the method, optionally including the first example, further includes where the first fuel is a carbon-containing fuel and the second fuel is a carbon-free fuel. A third example of the method, optionally including one or more of the previous examples, further includes where the carbon-containing fuel is one or more of diesel, hydrogenation-derived renewable diesel (HDRD), biodiesel, syn-gas, alcohol, gasoline, kerosene, ether, and natural gas. A fourth example of the method, optionally including one or more of the previous examples, further includes where the carbon-free fuel is one or more of hydrogen and ammonia. A fifth example of the method, optionally including one or more of the previous examples, further includes where adjusting a routing of EGR in response to an amount of water in the EGR. A sixth example of the method, optionally including one or more of the previous examples, further includes where adjusting routing of the EGR comprises providing EGR to the multi-fuel engine via an EGR passage, a donor cylinder, or EGR re-ingestion. A seventh example of the method, optionally including one or more of the previous examples, further includes where EGR re-ingestion comprises adjusting an exhaust valve timing to overlap with an intake valve opening.

The disclosure further provides support for a system including a first fuel system configured to supply a first fuel, a second fuel system configured to supply a second fuel, and a controller with instructions stored on non-transitory memory that when executed cause the controller to determine an amount of EGR delivered to each cylinder of a plurality of cylinders of a multi-fuel engine, and adjust a substitution ratio of each cylinder based on the amount of EGR. A first example of the system further includes where the substitution ratio comprises at least one of the first fuel and one of the second fuel, wherein the first fuel comprises one or more of diesel, hydrogenation-derived renewable diesel (HDRD), biodiesel, syn-gas, alcohol, gasoline, kerosene, ether, and natural gas, and wherein the second fuel comprises one or more of hydrogen and ammonia. A second example of the system, optionally including the first example, further includes where the substitution ratio is based on an amount of diesel, hydrogen, ammonia, and ethanol provided to the multi-fuel engine. A third example of the system, optionally including one or more of the previous examples, further includes where the instructions further cause the controller to adjust an ignition timing based on the amount of EGR, wherein water is present in the EGR when the EGR is routed through an EGR cooler. A fourth example of the system, optionally including one or more of the previous examples, further includes where the ignition timing is advanced as the amount of EGR increases. A fifth example of the system, optionally including one or more of the previous examples, further includes where the ignition timing is advanced via injecting a pilot injection of the first fuel prior to injecting a main injection of the first fuel. A sixth example of the system, optionally including one or more of the previous examples, further includes where the substitution ratio is increased as the amount of EGR increases.

The disclosure further provides support for a method including adjusting a substitution ratio of a cylinder in response to an amount of water provided to the cylinder, wherein the substitution ratio is based on two or more of diesel, hydrogen, ammonia, and ethanol being included in a combustion mixture and adjusting the amount of water provided to the cylinder via adjusting a routing of EGR. A first example of the method further includes adjusting the routing of EGR comprises flowing EGR through an EGR passage to increase the amount of water provided to the cylinder. A second example of the method, optionally including the first example, further includes where adjusting the routing of EGR comprises flowing EGR from a donor cylinder to decrease the amount of water provided to the cylinder. A third example of the method, optionally including one or more of the previous examples, further includes where adjusting the routing of EGR comprises re-ingesting EGR via adjusting an exhaust valve timing to decrease the amount of water provided to the cylinder. A fourth example of the method, optionally including one or more of the previous examples, further includes where adjusting the substitution ratio comprising increasing the substitution ratio via decreasing an amount of diesel and increasing an amount of one or more of hydrogen, ammonia, and ethanol in response to the amount of water increasing.

The disclosure provides support for a method including adjusting an ignitability of a combustion mixture comprising ammonia and hydrogen. A first example of the method further includes where the combustion mixture further comprises one or more of diesel, hydrogenation-derived renewable diesel (HDRD), biodiesel, syn-gas, alcohol, gasoline, kerosene, ether, and natural gas. A second example of the method, optionally including the first example, further includes where the combustion mixture further comprises ethanol. A third example of the method, optionally including one or more of the previous examples, further includes where selecting a substitution ratio based on an engine load, the engine load corresponding to a notch setting. A fourth example of the method, optionally including one or more of the previous examples, further includes where adjusting the ignitability comprises adjusting an amount of ammonia and an amount of hydrogen. A fifth example of the method, optionally including one or more of the previous examples, further includes where a substitution ratio of the combustion mixture is maintained in response to the ignition timing being adjusted. A sixth example of the method, optionally including one or more of the previous examples, further includes where adjusting the ignitability comprises adjusting an EGR flow rate. A seventh example of the method, optionally including one or more of the previous examples, further includes where adjusting an ignition timing based on the ignitability of the combustion mixture. An eighth example of the method, optionally including one or more of the previous examples, further includes where adjusting the ignition timing comprises adjusting a diesel injection timing, wherein the diesel injection timing comprises injecting a pilot injection prior to injecting a main injection. A ninth example of the method, optionally including one or more of the previous examples, further includes where adjusting the ignitability further comprises adjusting an amount of water provided to the combustion mixture, and wherein the ignitability is reduced via increasing the amount of water provided to the combustion mixture.

The disclosure further provides support for a system including a first fuel system configured to supply a first fuel, a second fuel system configured to supply a second fuel, and a controller with instructions stored on non-transitory memory that when executed cause the controller to select a substitution ratio based on an engine load, and adjust an ignitability of a combustion mixture comprising ammonia and hydrogen. A first example of the system further includes where the first fuel comprises one or more of diesel, hydrogenation-derived renewable diesel (HDRD), biodiesel, syn-gas, alcohol, gasoline, kerosene, ether, and natural gas, and wherein the second fuel comprises ammonia and hydrogen. A second example of the system, optionally including the first example, further includes where the instructions further cause the controller to adjust a ratio of ammonia and hydrogen while maintaining the substitution ratio to adjust the ignitability. A third example of the system, optionally including one or more of the previous examples, further includes where the instructions further cause the controller to adjust an injection timing via adjusting a number of injections of a carbon-containing fuel. A fourth example of the system, optionally including one or more of the previous examples, further includes where the instructions further cause the controller to adjust an EGR routing to adjust the ignitability, wherein the EGR routing comprises providing EGR via one or more of an EGR passage, a donor cylinder, re-ingestion, and retention, and wherein routing EGR through a cooler of the EGR passage adjusts an amount of water in the combustion mixture.

The disclosure further provides support for a method including selecting a substitution ratio and adjusting an ignitability via adjusting an amount of each of hydrogen and ammonia provided to a combustion mixture, wherein the combustion mixture further comprises at least one carbon-containing fuel at a fixed amount based on the substitution ratio. A first example of the method further includes where the at least one carbon-containing fuel is diesel or gasoline, further comprising another carbon-containing fuel comprising one or more of ethanol, hydrogenation-derived renewable diesel (HDRD), and biodiesel. A second example of the method, optionally including the first example, further includes where increasing an amount of hydrogen and decreasing an amount of ammonia to increase the ignitability, further comprising increasing the amount of ammonia and decreasing the amount of hydrogen to decrease the ignitability. A third example of the method, optionally including one or more of the previous examples, further includes where injecting ammonia into an exhaust gas stream based on the substitution ratio and a pH of the exhaust gas stream. A fourth example of the method, optionally including one or more of the previous examples, further includes where combusting the combustion mixture in a multi-fuel engine, wherein surfaces of the multi-fuel engine are galvanized.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
adjusting a substitution ratio in response to an amount of water provided to a multi-fuel engine configured to combust a first fuel and a second fuel, the second fuel different than the first fuel, wherein the first fuel is a liquid fuel and the second fuel is a gaseous fuel, and wherein the amount of water is based on an amount of condensate in an EGR cooler.

2. The method of claim 1, wherein the first fuel is a carbon-containing fuel and the second fuel is a carbon-free fuel.

3. The method of claim 2, wherein the carbon-containing fuel is one or more of diesel, hydrogenation-derived renewable diesel (HDRD), biodiesel, syn-gas, alcohol, gasoline, kerosene, ether, and natural gas.

4. The method of claim 2, wherein the carbon-free fuel is one or more of hydrogen and ammonia.

5. A method, comprising:
adjusting a substitution ratio in response to an amount of water provided to a multi-fuel engine configured to combust a first fuel and a second fuel, the second fuel different than the first fuel, and further comprising adjusting a routing of EGR in response to an amount of water in the EGR.

6. The method of claim 5, wherein adjusting routing of the EGR comprises providing EGR to the multi-fuel engine via an EGR passage, a donor cylinder, or EGR re-ingestion.

7. The method of claim 6, wherein EGR re-ingestion comprises adjusting an exhaust valve timing to overlap with an intake valve opening.

8. A method, comprising:
adjusting a substitution ratio of a cylinder in response to an amount of water provided to the cylinder, wherein the substitution ratio is based on two or more of diesel, hydrogen, ammonia, and ethanol being included in a combustion mixture; and
adjusting the amount of water provided to the cylinder via adjusting a routing of EGR, wherein adjusting the routing of EGR comprises flowing EGR from a donor cylinder to decrease the amount of water provided to the cylinder.

9. The method of claim 8, wherein adjusting the routing of EGR comprises flowing EGR through an EGR passage to increase the amount of water provided to the cylinder.

10. A method, comprising:
adjusting a substitution ratio of a cylinder in response to an amount of water provided to the cylinder, wherein the substitution ratio is based on two or more of diesel, hydrogen, ammonia, and ethanol being included in a combustion mixture; and
adjusting the amount of water provided to the cylinder via adjusting a routing of EGR, wherein adjusting the routing of EGR comprises re-ingesting EGR via adjusting an exhaust valve timing to decrease the amount of water provided to the cylinder.

11. The method of claim 8, wherein adjusting the substitution ratio comprising increasing the substitution ratio via decreasing an amount of diesel and increasing an amount of one or more of hydrogen, ammonia, and ethanol in response to the amount of water increasing.

12. The method of claim 5, wherein the first fuel is a liquid fuel and the second fuel is a gaseous fuel, and wherein the amount of water is based on an amount of condensate in an EGR cooler.

* * * * *